(12) United States Patent
Kline et al.

(10) Patent No.: US 12,534,735 B2
(45) Date of Patent: *Jan. 27, 2026

(54) MANNANASE VARIANTS

(71) Applicant: BASF SE, Ludwigshafen (DE)

(72) Inventors: Katie Kline, San Diego, CA (US); Amanda Rae Logue, San Diego, CA (US); Asfia Qureshi, San Diego, CA (US); Cindy Hoang, San Diego, CA (US); Jesper Nielsen, San Diego, CA (US); Mark Miller, San Diego, CA (US); Tong Li, San Diego, CA (US)

(73) Assignee: BASF SE, Ludwigshafen am Rhein (DE)

( * ) Notice: Subject to any disclaimer, the term of this patent is extended or adjusted under 35 U.S.C. 154(b) by 619 days.

This patent is subject to a terminal disclaimer.

(21) Appl. No.: 17/799,016

(22) PCT Filed: Feb. 12, 2021

(86) PCT No.: PCT/EP2021/053481
§ 371 (c)(1),
(2) Date: Aug. 11, 2022

(87) PCT Pub. No.: WO2021/160818
PCT Pub. Date: Aug. 19, 2021

(65) Prior Publication Data
US 2023/0081929 A1    Mar. 16, 2023

Related U.S. Application Data

(60) Provisional application No. 62/976,815, filed on Feb. 14, 2020.

(51) Int. Cl.
*C12N 9/24* (2006.01)
*C11D 3/386* (2006.01)
*C12N 15/52* (2006.01)

(52) U.S. Cl.
CPC .......... *C12N 15/52* (2013.01); *C12N 9/2491* (2013.01); *C12Y 302/01025* (2013.01)

(58) Field of Classification Search
None
See application file for complete search history.

(56) References Cited

FOREIGN PATENT DOCUMENTS

| EP | 2409981 A1 | 1/2012 |
| EP | 3385361 A1 | 10/2018 |
| EP | 3385377 A1 | 10/2018 |

OTHER PUBLICATIONS

GenPept Database Accession No. SFQ86316, "mannan endo-1,4-beta-mannosidase [Priestia endophytica DSM 13796]," Oct. 2016, 1 page (Year: 2016).*
International Application No. PCT/E2021/053481, International Search Report and Written Opinion, mailed Jun. 9, 2021.

* cited by examiner

*Primary Examiner* — David Steadman
(74) *Attorney, Agent, or Firm* — ArentFox Schiff LLP

(57) ABSTRACT

A mannanase at least 75% identical to SEQ ID NO: 2, SEQ ID NO: 3, or SEQ ID NO: 4, a polynucleotide encoding the mannanase, an expression construct comprising the polynucleotide, and a host cell comprising the polynucleotide or the expression construct.

19 Claims, No Drawings
Specification includes a Sequence Listing.

MANNANASE VARIANTS

CROSS-REFERENCE TO RELATED APPLICATIONS

This is the U.S. national phase of International Application No. PCT/EP2021/053481, filed Feb. 12, 2021, which claims the benefit of U.S. Provisional Patent Application No. 62/976,815, filed on Feb. 14, 2020.

INCORPORATION BY REFERENCE OF MATERIAL SUBMITTED ELECTRONICALLY

The Sequence Listing, which is a part of the present disclosure, is submitted concurrently with the specification as a text file. The name of the text file containing the Sequence Listing is "201903A_Seqlisting", which was created on Aug. 1, 2022 and is 12,000 bytes in size. The subject matter of the Sequence Listing is incorporated herein in its entirety by reference.

This invention relates to variants of mannanase enzyme. The variants are useful in industrial applications wherein degradation or modification of mannan is desired, such as in laundry and cleaning applications, in feed, food, pulp and paper and oil industry. The invention also provides useful mannanases enzymes, polynucleotides encoding these enzymes, enzyme compositions and methods for their production and use.

The main role of hemicelluloses and galactomannans is to function as structural polysaccharide and/or as reserve energy. Besides amylose and amylopectin which are the most widespread storage polysaccharides in plants, there is a diverse group of mannan-based polysaccharides found in seeds, roots, bulbs and tubers of various plants. These include mannans, galactomannans and glucomannans.

Mannans are polysaccharides with a backbone of β-1,4-linked D-mannopyranosyl residues. In most cases the mannans are highly insoluble in water but have high water binding capacity. In contrast to unsubstituted mannans, the galactomannans are water soluble. Due to the complex structural composition of the plant cell wall, microorganisms thriving on decaying plant material must possess a number of different enzymes that are able to hydrolyse these highly polymeric and mostly insoluble materials. The two major endo-acting enzymes involved in degradation of hemicelluloses are beta-mannanase and beta-xylanase. In addition, the exo-acting enzymes beta-mannosidase, alpha-galactosidase and beta-glucosidase are needed for complete degradation of galactoglucomannan.

The main enzyme type participating in the degradation of mannan backbones are endo-1,4-beta-mannanases (EC 3.2.1.78), which hydrolyze the internal glycoside bonds in the mannan backbone. Endo-1,4-β-mannanases (EC 3.2.1.78) are mannan-degrading enzymes which may be called endo-β-1,4-D-mannanase, β-mannanase, or mannanase herein. Since endo-1,4-beta-mannanases (EC 3.2.1.78) degrade the mannan-backbone, mannan-degradation includes the degradation of mannans, galactomannans and/or glucomannans.

The use of mannanase enzymes is widespread in food and feed applications, the detergent, and the pulp and paper industry:

The use of mannanase enzymes as feed additives has been shown to provide several beneficial effects since mannan is a contributing factor to viscosity of gut contents and it thereby adversely affects the feed digestibility and animal growth rate.

In the food industry mannanase enzymes are described for the use in the production of instant coffee where the enzyme reduces the viscosity of the coffee extracts due to hydrolysis of the coffee mannan. Further, mannanases are used to produce specific manno-oligomers that are of interest as functional food ingredients such as manno-oligomers with a prebiotic functionality. In such applications plant derived manno-polymers are subjected to hydrolysis by mannanases.

It is common to use mannanases in the processing and manufacturing fruit juice because it lowers viscosity and improves filtration rate, stability and helps to extract fruit components.

Detergent use: mannanases facilitate the removal of food and cosmetic derived stains/soils that often comprise mannan containing additives like stabilizers, emulsifiers and thickeners. In a more specific cleaning application mannanases are applied to remove biofilms from surfaces or tubings that need to be free from microbials like pharmaceutical equipment. In this application mannanases are often used in combination with detergents and other enzymes like carbohydrases and proteases.

Pulp and paper: mannanases are used in the enzyme-aided bleaching of paper pulp. Mannanases are said to complement the action of xylananses.

Mannanases are applied in the process of oil and gas well stimulation by hydraulic fracturing. Mannanases reduce viscosity of a guar solution that is applied in the process.

Mannanases are used in the controlled release of drugs or other material from matrices that are composed of cross-linked galactomannans.

Activity under application conditions is a critical parameter for many industrially applied enzymes, since these enzymes often tend to be insufficiently active under application conditions. Therefore, it was an objective of the present invention to find mannanase variants with improved performance especially after storage of the same over a certain period of time.

The mannanase variants of the invention are advantageous in having good stability and mannanase activity. Further, the mannanase variants of the invention may provide improved yield in production and better performance in use.

There is a continuous need for enzymes that perform in the harsh environment of detergent formulations. Mannanases are useful components of washing and/or cleaning formulations since mannanases remove part of hemicellulose comprising stains.

Mannan-comprising stains or mannan-containing stains herein comprise at least one mannan, at least one galactomannan and/or at least one glucomannan and in one embodiment, further constituents such as cellulose and/or hemicellulose. Further, such stains may comprise proteinaceous material, starch and/or sugars. Galactomannans usually consist of a mannose backbone with galactose side groups. Herein, galactomannans include galactomannans having the following mannose to galactose ratio: fenugreek gum about 1:1, guar gum about 2:1, tara gum about 3:1, locust bean gum or carob gum about 4:1, cassia gum about 5:1, wherein the ratio is mannose:galactose. Galactomannans are often used in food and cosmetic products to increase the viscosity of a liquid product.

Insufficient removal of these types of stains may e.g. result in fabric graying. Hence, it was a further objective of the invention to find mannan degrading enzymes, catalytically active in detergent formulations having a pH in the range of 5-12, preferably in the range of 6-11, more preferably selected from the ranges of 6-10, 7-9, and 7.5-8.5.

The invention provides mannanase variants particularly stable in detergents and at temperatures typically used in washing and cleaning applications where mannan degradation is used, such as in laundry detergents.

In one aspect, the present invention provides a mannanase having mannan degrading activity at a pH in the range of 5-12 or 6-11, more preferably a pH in the range of 6-10 or 7-9, and most preferably at a pH in the range of 7.5-8.5. The mannanase is at least 75% identical to SEQ ID NO: 2, preferably at least 75% identical to a sequence according to positions 31-490 of SEQ ID NO: 2. The sequence according to positions 31-490 of SEQ ID NO: 2 equals SEQ ID NO: 3. The mannanase may be at least 75% identical to a sequence according to positions 31-327 of SEQ ID NO: 2. The sequence according to positions 31-327 of SEQ ID NO: 2 equals SEQ ID NO: 4.

In one aspect, the invention provides a polynucleotide sequence encoding a mannanase variant according to the invention.

In one aspect, the invention provides a vector comprising the polynucleotide sequence of the invention.

In one aspect, the invention provides a recombinant host cell comprising the polynucleotide of the invention of the invention which enables the host cell to express at least one recombinant mannanase variant according to the invention.

In one aspect, the invention provides a method of expressing a polynucleotide, comprising the steps of
  (a) providing a host cell comprising a heterologous nucleic acid construct comprising a polynucleotide encoding the mannanase variant according to the invention by introducing the nucleic acid construct comprising the polynucleotide encoding the mannanase variant according to the invention into the host cell;
  (b) cultivating the recombinant host cell of step (a) under conditions conductive for the expression of the polynucleotide; and
  (c) optionally, recovering a protein of interest encoded by the polynucleotide.

In one aspect of the invention, the mannanase variant according to the invention is provided within an enzyme preparation that allows to be flexibly formulated into liquid formulations such as liquid detergent formulations with either one type of enzymes or mixtures of enzymes. The enzyme preparation may further comprise other enzyme(s) selected from the group consisting of proteases, amylases, cellulases, lipases, xylanases, mannanases, cutinases, esterases, phytases, DNAses, pectinases, pectate lyases, pectinolytic enzymes, carbohydrases, arabinases, galactanases, xanthanases, xyloglucanases, laccases, peroxidases and oxidases with, as well as suitable additives selected from the group consisting of compounds stabilizing the enzymes comprised such as enzyme stabilizers, and compounds stabilizing the preparation such as preservatives.

In one aspect, the invention at hand provides a formulation preferably having a pH in the range of 5-12, preferably in the range of 6-11, more preferably in a range selected from 6-10, 7-9, and 7.5-8.5 comprising a mannanase variant according to the invention. Preferably, the formulation is a liquid formulation comprising at least one component selected from surfactants, builders, and hydrotropes is present in amounts effective in maintaining the physical characteristics of the liquid formulation and/or in cleaning. In one embodiment, the formulation is a detergent formulation.

The detergent formulation comprising at least one mannanase variant according to the invention is advantageous in that it is removing mannan containing stains.

Sequences

The sequences used herein are as follows:

```
SEQ ID NO: 1 polynucleotide sequence encoding
the parent mannanase according to SEQ ID
NO: 2:
atgtcaatta ttaagaaagt tccattaata tttctatgtc tcctaatgtt tgctacttct ctatttattt ttaagcctga ggtaaaagca gcaactggct tttatgtaaa cggaaacact ctgtacgatg caacaggtag cccgtttgtt atgaggggaa ttaaccatgc tcattcttgg tttaaagatg attcttctac agcaatccct gctatagcga agacaggggc taatactatt agaatcgtcc tatctgatgg aagccagtat acaaaagatg atattaatac agtaaaaagt cttatatcct tagctgagaa gaataacctt attgc-tattt tagaggtgca tgatgccaca ggaaacgatg ctgttagctc gttaaacgat gctgttagct attggattag tattaaagag gctcttattg gaaaagaaga tagggtctta attaatattg ccaatgaatg gtatggtact tgggatggtg caagttgggc aagtggctat aaacaggcta ttccaaagtt aagagatgct ggactcagcc atacattaat tgtagattcc gcaggttggg gacaatatcc agagtctatc catcaatatg gtaaagatgt atttaatgct gatccactaa aaaatacaat gttttctatt cat-atgtatg aatatgctgg ggggatgct tccactatta aatcaaatat tgacggagta ctgaatcagg atcttgcatt aattattggt gaatttggac ataaacatac gaatggagat gttgatgagg aaacaattat gagttactca cagcagaaga atgttggttg gttagcttgg tettggaaag gtaatggccc cgagtggagt tatttagact tatcaaatga ttgggctgga gataatttaa cctcgtgggg taatacaatt gtaaatggag ctaatggttt aaaagctact tctaaaataa gtccagtatt tgatggagga gatcatcctg gtggttcagg tggaactgaa aatactttgt ataatttcga aaccgaaaca caaagctgga gtggtggaaa tgtaatggct ggaccctggt caacgaatga gtgggcatca aaagacaact attcttaaa agctgatgtt caattaaaca ataattccca gcattattta tctttaactc aaaaccaaaa tttcagtggg aaatctcaac taaaggcaac tgtaaagcac gctgattggg gaaatctagg gaatggaatt aatgcacagt tatatgtgaa aacagggtca gattggaaat ggtttgatgg tga-gagtgta gaattaatt cctccaatgg aactatttta actttagatt tatcatccat ctccgattta aatgacatta aagagattgg cgtgcagttt atgggctctt cgaaaagcag tggtcaaaca
```

-continued

```
gctgtatacg ttgacaacgt aacaattcaa taa
```

SEQ ID NO: 2 parent mannanase (490AA
including signal sequence) in its one-letter code:
MSIIKKVPLIFLCLLMFATSLFIFKPEVKAATGFYVNGNTLYDA

TGSPFVMRGIN-HAHSWFKDDSSTAIPAIAKTGANTIRIVLSDG

SQYTKDDINTVKSLISLAEKNNLI-AILEVHDATGNDAVSSLND

AVSYWISIKEALIGKED-RVLINIANEWYGTWDGASWASGYKQA

IPKLRDAGLSHTLIVDSAGWGQYPESIHQYGKDVF-NADPLKNT

MFSIHMYEYAGGDASTIKSNIDGVLNQDLALIIGEFGHKHTNGD

VDEETIM-SYSQQKNVGWLAWSWKGNGPEWSYLDLSNDWAGDNL

TSWGN-TIVNGANGLKATSKISPVFDGGDHPGGSGGTENTLYNF

ETETQSWSGGNVMAG-PWSTNEWASKDNYSLKADVQLNNNSQHY

LSLTQNQNFSGKSQLKATVKHADWGN-LGNGINAQLYVKTGSDW

KWFDGESVEINSSNGTILT-LDLSSISDLNDIKEIGVQFMGSSK

SSGQTAVYVDNVTIQ

SEQ ID NO: 3 mature parent mannanase including
linker and CBD (carbohydrate domain) in its
one-letter code:
ATGFYVNGNTLYDATGSPFVMRGINHAHSWFKDDSSTAIPAIAK

TGANTIRI-VLSDGSQYTKDDINTVKSLISLAEKNNLIAILEVH

DATGNDAVSSLNDAVSYWISIKEA-LIGKEDRVLINIANEWYGT

WDGASWASGYKQAIPKLRDAGLSHTLIVDSAG-WGQYPESIHQY

GKDVFNADPLKNTMFSIHMYEYAGGDASTIKSNIDGVLNQDLAL

I-IGEFGHKHTNGDVDEETIMSYSQQKNVGWLAWSWKGNGPEWS

YLDLSNDWAG-DNLTSWGNTIVNGANGLKATSKISPVFDGGDHP

GGSGGTENTLYNFETETQSWSGGNVMAG-PWSTNEWASKDNYSL

KADVQLNNNSQHYLSLTQNQNFSGKSQLKATVKHADWGN-LGNG

INAQLYVKTGSDWKWFDGESVEINSSNGTILT-LDLSSISDLND

IKEIGVQFMGSSKSSGQTAVYVDNVTIQ

SEQ ID NO: 4 mature parent mannanase without
linker and CBD (carbohydrate domain) in its
one-letter code:
ATGFYVNGNTLYDATGSPFVMRGINHAHSWFKDDSSTAIPAIAK

TGANTIRI-VLSDGSQYTKDDINTVKSLISLAEKNNLIAILEVH

DATGNDAVSSLNDAVSYWISIKEA-LIGKEDRVLINIANEWYGT

WDGASWASGYKQAIPKLRDAGLSHTLIVDSAG-WGQYPESIHQY

GKDVFNADPLKNTMFSIHMYEYAGGDASTIKSNIDGVLNQDLAL

I-IGEFGHKHTNGDVDEETIMSYSQQKNVGWLAWSWKGNGPEWS

YLDLSNDWAG-DNLTSWGNTIVNGANGLKATSKISPVF

DETAILED DESCRIPTION OF THE INVENTION

It is to be understood that as used in the specification and in the claims, "a" or "an" can mean one or more (in the sense of "at least one"), depending upon the context in which it is used.

Further, it will be understood that the term "at least" means that the item or parameter to which the term refers is limited in one direction but open ended in one or more other directions.

As used in the following, the terms "have", "comprise", "contain" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present.

Features introduced by "in one embodiment" or similar expressions are intended to be additional or alternative features, without any restriction regarding alternative embodiments of the invention, without any restrictions regarding the scope of the invention and without any restriction regarding the possibility of combining the features introduced in such way with other additional or alternative or non-additional or alternative features of the invention. The term "may" preferably herein encompasses embodiments.

The term "about" as used herein means that with respect to any number recited after said term an interval accuracy exists within in which a technical effect can be achieved. Accordingly, about as referred to herein, preferably, refers to the precise numerical value or a range around said precise numerical value of ±15%, preferably ±10%, more preferably ±5%, or even more preferably ±3%.

Generally, "enzymes" are catalytically active proteins or polypeptides acting on substrates and converting these into products. This reaction may be called enzymatic conversion herein which typically takes place at the "active site" of an enzyme. Enzymes exerting enzymatic conversion are enzymatically active or have enzymatic activity. Any polypeptide called "enzyme" herein means polypeptides being catalytically active.

The mannanase variants according to the invention have mannan degrading activity and are of the enzyme class EC 3.2.1.78. In one embodiment, mannan degrading activity relates to degradation of at least one galactomannan. Preferably, at least one galactomannan is characterized by the ratio mannose:galactose of about 1:1, about 2:1, about 3:1, about 4:1, and/or 5:1.

Mannan degrading activity or mannanase activity may be tested according to standard test procedures known in the art. For example: a mannanase to be tested may be applied to 4 mm diameter holes punched out in agar plates comprising 0.2% AZCL galactomannan (carob), i.e. substrate for the assay of endo-1,4-beta-D-mannanase available as I-AZGMA from the company Megazyme (Megazyme's Internet address: world wide web at megazyme.com/Purchase/index html). Mannan degrading activity may be tested in a liquid assay using carob galactomannan dyed with Remazol Brilliant Blue as described in McCleary, B. V. (1978). Carbohydrate Research, 67 (1), 213-221. Another method for testing mannan degrading activity uses detection of reducing sugars when incubated with substrate such as guar gum or locust bean gum—for reference see Miller, G. L. Use of Dinitrosalicylic Acid Reagent for Determination of Reducing Sugars. Analytical Chemistry 1959; 31:426-428.

Enzymes are polypeptides which are usually identified by polypeptide sequences (also called amino acid sequences herein). Polypeptide sequences are usually identified by a SEQ ID NO: according to the World Intellectual Property Office (WIPO) Standard ST.25 (1998) the amino acids herein are represented using three-letter code with the first letter as a capital or the corresponding one letter.

A polypeptide is usually encoded by a polynucleotide. The polynucleotide usually is identified by a polynucleotide sequence and by a SEQ ID NO: which is provided according to the World Intellectual Property Office (WIPO) Standard ST.25 (1998) in the sequence listing accompanying this disclosure.

A "parent" polypeptide amino acid sequence is the starting sequence for introduction of mutations (e.g. by introducing one or more amino acid substitutions, insertions, deletions, or a combination thereof) to the sequence, resulting in "variants" of the parent polypeptide amino acid sequences. A parent includes: A wild-type polypeptide amino acid sequence or synthetically generated polypeptide amino acid sequence that is used as starting sequence for introduction of (further) changes.

The parent polypeptide for the mannanase variants of this invention may have a polypeptide sequence according to SEQ ID NO: 2, SEQ ID NO: 3, or SEQ ID NO: 4. In one aspect of the invention the parent polypeptide has a sequence according to positions 31-490 of SEQ ID NO: 2. The sequence according to positions 31-490 of SEQ ID NO: 2 equals SEQ ID NO: 3. In another aspect of the invention the parent polypeptide has a sequence according to positions 31-327 of SEQ ID NO: 2. The sequence according to positions 31-327 of SEQ ID NO: 2 equals SEQ ID NO: 4.

A "variant polypeptide" refers to an enzyme that differs from its parent in its amino acid sequence. An enzyme or polypeptide "at least x % identical to SEQ ID NO:X" means an enzyme or polypeptide having a polypeptide sequence which is x % identical when compared to the polypeptide sequence according to SEQ ID NO:X, wherein SEQ ID NO:X means the sequences according to the invention. In one embodiment, SEQ ID NO:X is selected from SEQ ID NO: 2, SEQ ID NO: 3 and SEQ ID NO: 4.

A polynucleotide "at least y % identical to SEQ ID NO:Y" means a polynucleotide having a polynucleotide sequence which is y % identical when compared to the polynucleotide sequence according to SEQ ID NO:Y, which corresponds to SEQ ID NO: 1 herein.

Variant polypeptide sequences may be defined by their "sequence identity" when compared to a parent sequence. Sequence identity usually is provided as "% sequence identity" or "% identity". For calculation of sequence identities, in a first step a sequence alignment has to be produced.

According to the invention, the alignment is generated by using the algorithm of Needleman and Wunsch (J. Mol. Biol. (1979) 48, p. 443-453). Preferably, the program "NEEDLE" (The European Molecular Biology Open Software Suite (EMBOSS)) is used for the purposes of the current invention, with using the programs default parameter (polynucleotides: gap open=10.0, gap extend=0.5 and matrix=EDNAFULL; polypeptides: gap open=10.0, gap extend=0.5 and matrix=EBLOSUM62).

After aligning two sequences, in a second step, an identity value is determined from the alignment produced.

In a preferred embodiment, the %-identity is calculated by dividing the number of identical residues by the length of the alignment region which is showing the two aligned sequences over their complete length multiplied with 100: %-identity=(identical residues/length of the alignment region which is showing the two aligned sequences over their complete length)*100.

Polypeptide According to Invention

A polypeptide of the invention is at least 75%, at least 80%, at least 85%, at least 90%, at least 91%, at least 92%, at least 93%, at least 94%, at least 95%, at least 96%, at least 97%, at least 98%, or at least 99% identical to SEQ ID NO: 2 and wherein the polypeptide has mannan-degrading activity. In one aspect of the invention, the mannanase variant according to the invention is at least 75%, at least 80%, at least 85%, at least 90%, at least 91%, at least 92%, at least 93%, at least 94%, at least 95%, at least 96%, at least 97%, at least 98%, or at least 99% identical to the sequence according to positions 31-490 of SEQ ID NO: 2 or according to SEQ ID NO: 3, and wherein the polypeptide has mannan-degrading activity.

In one embodiment, a mannanase variant according to the invention is at least 75%, at least 80%, at least 85%, at least 90%, at least 91%, at least 92%, at least 93%, at least 94%, at least 95%, at least 96%, at least 97%, at least 98%, or at least 99% identical to the sequence according to positions 31-327 of SEQ ID NO: 2 or according to SEQ ID NO: 4, and wherein the polypeptide has mannan-degrading activity.

The mannanase variants may further comprise one or more conservative substitutions, meaning that one amino acid is substituted with a similar amino acid. Similar amino acids according to the invention are defined as follows:

amino acid A is similar to amino acids S; amino acid D is similar to amino acids E and N; amino acid E is similar to amino acids D, K, and Q; amino acid F is similar to amino acids W and Y; amino acid H is similar to amino acids N and Y; amino acid I is similar to amino acids L, M, and V; amino acid K is similar to amino acids E, Q, and R; amino acid L is similar to amino acids I, M, and V; amino acid M is similar to amino acids I, L, and V; amino acid N is similar to amino acids D, H, and S; amino acid Q is similar to amino acids E, K, and R; amino acid R is similar to amino acids K and Q; amino acid S is similar to amino acids A, N, and T; amino acid T is similar to amino acids S; amino acid V is similar to amino acids I, L, and M; amino acid W is similar to amino acids F and Y; amino acid Y is similar to amino acids F, H, and W.

A mannanase variant according to the invention is a "mature polypeptide" meaning an enzyme in its final form including any post-translational modifications, glycosylation, phosphorylation, truncation, N-terminal modifications, C-terminal modifications, signal sequence deletion. A mature polypeptide can vary depending upon the expression system, vector, promoter, and/or production process. The mature mannanase variant according to the invention may be at least 75% identical to the sequence according to positions 31-490 of SEQ ID NO: 2 or may be at least 75% identical to the sequence according to SEQ ID NO: 3. The mature mannanase variant according to the invention may be at least 75% identical to the sequence according to positions 31-327 of SEQ ID NO: 2 or at least 75% identical to the sequence according to SEQ ID NO: 4.

The invention provides a polypeptide at least 75% identical to the sequence according to SEQ ID NO: 2 or SEQ ID NO: 3 comprising two or more amino acid substitutions selected from A31, Q89, N96, A119, E264, W289, N312, T348, E349, S352, and D379, wherein the numbering is according to SEQ ID NO: 2, and wherein the polypeptide has mannan-degrading activity. In one embodiment, the polypeptide is combined with one or more amino acid substitutions selected from D86, L101, S103, K107, N108, N109, A112, N122, A124, S126, S127, N129, S231, I233, S235, D244, H254, K255, S270, Q272, K273, N274, S281, G286, S290, N296, D301, T309, A314, L317, A319, D328I, G329, G330, D331, N341, Y344, F346, G356, M359, Y374, L416, and W432, wherein the numbering is according to SEQ ID NO: 2.

In one embodiment, the polypeptide at least 75% identical to the sequence according to SEQ ID NO: 2 or SEQ ID NO: 3 comprises two or more amino acid substitutions selected from A31V, Q89V, N96D, A119Y/H/T, E264Q/V, W289F/M/H, N312F/Y, T348S/R/N/M/G, E349T/S/D/G, S352N/G, and D379V, wherein the numbering is according to SEQ ID NO: 2 and wherein the polypeptide has mannan-degrading activity.

In one embodiment, the mannanase variant comprises the amino acid substitutions Q89V and N96D and one or more amino acid substitutions selected from A31V, A119Y/H/T, E264Q/V, W289F/M/H, N312F/Y, T348S/R/N/M/G, E349T/S/D/G, S352N/G and D379V. In one embodiment, the mannanase variant comprises the amino acid substitutions Q89V and N96D and A119Y/H/T and one or more amino acid substitutions selected from A31V, E264Q/V, W289F/M/H, N312F/Y, T348S/R/N/M/G, E349T/S/D/G, S352N/G and D379V. In one embodiment, the mannanase comprises at least the amino acid substitutions Q89V, N96D and A119H, preferably in combination with one or more amino acid substitutions selected from A31V, E264Q/V, W289F/M/H, N312F/Y, T348S/R/N/M/G, E349T/S/D/G, S352N/G and D379V. In one embodiment, the mannanase comprises at least the amino acid substitutions Q89V, N96D, A119H and N312F/Y, preferably in combination with one or more amino acid substitutions selected from A31V, E264Q/V, W289F/M/H, T348S/R/N/M/G, E349T/S/D/G, S352N/G and D379V. In one embodiment, the mannanase comprises at least the amino acid substitutions Q89V, N96D, A119H, W289F/M/H and N312F/Y, preferably in combination with one or more amino acid substitutions selected from A31V, E264Q/V, T348S/R/N/M/G, E349T/S/D/G, S352N/G and D379V. In one embodiment, the mannanase comprises at least the amino acid substitutions Q89V, N96D, A119H, E264Q/V, W289F/M/H and N312F/Y, preferably in combination with one or more amino acid substitutions selected from A31V, T348S/R/N/M/G, E349T/S/D/G, S352N/G and D379V. In one embodiment, the mannanase comprises at least the amino acid substitutions Q89V, N96D, A119H, E264Q/V, W289F/M/H, N312F/Y and T348S/R/N/M/G, preferably in combination with one or more amino acid substitutions selected from A31V, E349T/S/D/G, S352N/G and D379V. In one embodiment, the mannanase comprises at least the amino acid substitutions Q89V, N96D, A119H, E264Q/V, W289F/M/H, N312F/Y, T348S/R/N/M/G and E349T/S/D/G, preferably in combination with one or more amino acid substitutions selected from A31V, S352N/G and D379V. In one embodiment, the mannanase comprises at least the amino acid substitutions Q89V, N96D, A119H, E264Q/V, W289F/M/H, N312F/Y, T348S/R/N/M/G, E349T/S/D/G and S352N/G preferably in combination with one or more amino acid substitutions selected from A31V, and D379V. In all mentioned embodiments the numbering is according to SEQ ID NO: 2. Preferably, A at position 119 is substituted for H, E at position 264 is substituted for Q, W at position 289 is substituted for M, N at position 312 is substituted for Y, T at position 348 is substituted for N, E at position 349 is substituted for G, S at position 352 is substituted for G.

In one embodiment, the polypeptide is combined with one or more amino acid substitutions selected from D86N, L101T/V, S103Y/E/A, K107N, N108G, N109Q/A, A112N, N122S, 124E/C/D, S126E, S127A, N129M/L/F, S231Q/K/L/P/Y, I233V, S235H/R/L/Q/N/Y, D244I/V/N, H254W, K255Y/H/R, S270T, Q272I, K273T, N274E/C/Q, S281L, G286E/L/Q/A, S290A, N296H/F/Y, D301E/C/T, T309L, A314P, L317T, A319D/E, D328I/Q/V, G329L/S/V/T, G330P/D/T, D331A/Q, N341F, Y344Q/F/T, F346T, G356Y/V/T/Q/H/C, M359R/Y/C/Q, Y374G/V/A/R/N/P, L416W, and W432P/N/L/R/S/T/G/H/I, wherein the numbering is according to SEQ ID NO: 2.

The invention provides a polypeptide at least 75% identical to the sequence according to SEQ ID NO: 4 comprising two or more amino acid substitutions selected from A31, Q89, N96, A119, E264, W289, and N312, wherein the numbering is according to SEQ ID NO: 2, and wherein the polypeptide has mannan-degrading activity. In one embodiment, the polypeptide is combined with one or more amino acid substitutions selected from D86, L101, S103, K107, N108, N109, A112, N122, A124, S126, S127, N129, S231, I233, S235, D244, H254, K255, S270, Q272, K273, N274, S281, G286, S290, N296, D301, T309, A314, L317, and A319, wherein the numbering is according to SEQ ID NO: 2.

In one embodiment, the polypeptide at least 75% identical to the sequence according to SEQ ID NO: 4 comprises two or more amino acid substitution selected from A31V, Q89V, N96D, A119Y/H/T, E264Q/V, and W289F/M/H, N312F/Y, wherein the numbering is according to SEQ ID NO: 2, and wherein the polypeptide has mannan-degrading activity. In one embodiment, the polypeptide is combined with one or more amino acid substitutions selected from D86N, L101T/V, S103Y/E/A, K107N, N108G, N109Q/A, A112N, N122S, 124E/C/D, S126E, S127A, N129M/L/F, S231Q/K/L/P/Y, I233V, S235H/R/L/Q/N/Y, D244I/V/N, H254W, K255Y/H/R, S270T, Q272I, K273T, N274E/C/Q, S281L, G286E/L/Q/A, S290A, N296H/F/Y, D301E/C/T, T309L, A314P, L317T, and A319D/E, wherein the numbering is according to SEQ ID NO: 2.

The mature polypeptide molecules at least 75% identical to the sequence according to positions 31-490 or positions 31-327 of SEQ ID NO: 2 (SEQ ID NO 3 and SEQ ID NO: 4 respectively) comprising substitutions as disclosed above are called "mannanase variants according to the invention". All substitutions with a numbering above 327 are only possible in polypeptides relating to SEQ ID NO: 3. Thus for polypeptides relating to SEQ ID NO: 4, the following applies:

In one embodiment, the mannanase variant according to the invention comprises the amino acid substitutions Q89V and N96D and one or more amino acid substitutions selected from A31V, A119Y/H/T, E264Q/V, W289F/M/H, and N312F/Y. In one embodiment of the invention, the mannanase variant according to the invention comprises at least one amino acid substitution selected from Q89V and N96D and two or more amino acid substitutions selected from A31V, A119Y/H/T, E264Q/V, W289F/M/H, and N312F/Y. In one embodiment, the mannanase variant according to the invention comprises the amino acid substitutions Q89V, N96D, and A119Y/H/T, and one or more amino acid substitutions selected from A31V, E264Q/V, W289F/M/H, and N312F/Y. In one embodiment, the mannanase comprises at least the amino acid substitutions Q89V, N96D and A119H, preferably in combination with one or more amino acid substitutions selected from A31V, E264Q/V, W289F/M/H and N312F/Y. In one embodiment, the mannanase comprises at least the amino acid substitutions Q89V, N96D, A119H and N312F/Y, preferably in combination with one or more amino acid substitutions selected from A31V, E264Q/V and W289F/M/H. In one embodiment, the mannanase comprises at least the amino acid substitutions Q89V, N96D, A119H, W289F/M/H and N312F/Y, preferably in combination with A31V and E264Q/V. In one embodiment, the mannanase comprises at least the amino acid substitutions Q89V, N96D, A119H, E264Q/V, W289F/M/H and N312F/Y. In all mentioned embodiments the numbering is according to SEQ ID NO: 2. Preferably, A at position 119 is substituted for H, E at position 264 is substituted for Q, W at position 289 is substituted for M, N at position 312 is substituted for Y, T at position 348 is substituted for N, E at position 349 is substituted for G, S at position 352 is substituted for G.

The invention specifically relates to mannanase variants having an amino acid sequence which is at least 75% identical to SEQ ID NO:3 or SEQ ID NO:4 comprising the amino acid substitutions as disclosed in Tables Ex4a, Ex4b and Ex4c below.

In one aspect of the invention, a mannanase variant according to the invention, comprises one or more conservative amino acid substitutions at the following positions: T32S, N37S, F61Y, I80V, Y90W, T91S, K99R, S100N, V125I, L150I, D179N, S183N, Y196F, D206E, D229N, N258D, I323L, N345D, V358I, S370A, N383S, N384S, Q423K, F435Y, D459N, N461S, I463V, V482L, wherein the mannanase variant is at least 75% identical to the sequence according to SEQ ID NO: 2, or SEQ ID NO: 3, or SEQ ID NO: 4, and wherein the numbering is according to SEQ ID NO: 2. The mannanase variants according to the invention may comprise combinations of amino acid substitutions selected from T32S, T91S, K99R, S100N, V125I, D179N, S183N, Y196F, D206E, N258D, V358I, S370A, Q423K, D459N, N461S, and V482L. The mannanase variants according to the invention may comprise combinations of amino acid substitutions selected from T32S, N37S, F61Y, I80V, Y90W, K99R, S100N, V125I, L150I, D179N, S183N, Y196F, D206E, D229N, and I323L. Preferably, the mannanase variants according to the invention comprise one or more conservative amino acid substitutions selected from N37S, F61Y, I80V, Y90W, T91S, L150I, D229N, N258D, I323L, N345D, V358I, S370A, N383S, N384S, Q423K, F435Y, D459N, N461S, I463V, and V482L, wherein the mannanase variant is at least 75% identical to the sequence according to SEQ ID NO: 2, or SEQ ID NO: 3, or SEQ ID NO: 4, and wherein the numbering is according to SEQ ID NO: 2.

In one embodiment, the mannanase variants according to the invention, comprise one or more amino acid substitutions at the following positions: N39T, T45N, D64Q, S133D, E140S, S168D, A173V, Q202N, S305D, H332D, G335D, A360G, A365V, D372G, Q381N, S391Y, F398L, K433T, E438G, I449T, and K475N, wherein the mannanase variant is at least 75% identical to the sequence according to SEQ ID NO: 2, or SEQ ID NO: 3, or SEQ ID NO: 4, and wherein the numbering is according to SEQ ID NO: 2. The mannanase variants according to the invention may comprise combinations of amino acid substitutions selected from S133D, S168D, A173V, Q202N, S305D, H332D, G335D, A365V, D372G, Q381N, S391Y, E438G, and K475N. The mannanase variants according to the invention may comprise combinations of amino acid substitutions selected from N39T, T45N, D64Q, S133D, E140S, and S168D. Preferably, the mannanase variants according to the invention comprise one or more amino acid substitutions selected from A360G and I449T, wherein the mannanase variant is at least 75% identical to the sequence according to SEQ ID NO: 2 or SEQ ID NO: 3, and wherein the numbering is according to SEQ ID NO: 2.

In one embodiment, the mannanase variants according to the invention comprise one or more "conserved amino acid regions" within their polypeptide sequence. "Conserved amino acid regions" herein are characterized in a number of consecutive amino acids being not mutated, wherein the number of consecutive amino acids is 3-10, 4-10, 5 to 10, 6, 7, 8, 9, or 10. One or more conserved amino acid regions may be selected from G76-A77-N78-T79, R81-V83-L84, E115-V116-H117-D118, Y134-W135-I136, A154-N155-E156-W157, A191-G192-W193-G194-Q195, F218-S219-I220-H221-M222-Y223-E224-Y225-A226-G227, N236-I237-D238, I249-G250-E251-F252-G253, G259-D260-V261-D262-E263, and G276-W277-L278-A279-W280, and wherein the numbering is according to SEQ ID NO: 2.

The mannanase variant according to the invention may have a mannan degrading activity at a pH in the range of 5-12, preferably in the range of 6-11, more preferably in a range selected from 6-10, 7-9, and 7.5-8.5. In one embodiment, a mannanase variant according to the invention has mannan degrading activity within a formulation having a pH in the range of 5-12, preferably in the range of 6-11, more preferably in a range selected from 6-10, 7-9, and 7.5-8.5.

The mannanase variants of the invention have improved in-surfactant-stability when compared to the parent enzyme.

Improved in-surfactant-stability means that the remaining mannan degrading activity after a certain period of time at a specific temperature is increased when compared to the parent enzyme. "A certain period of time" may mean 1 or more days, preferably 1 to 15 days, more preferably up to 6 days. "Specific temperature" may mean 37° C. or 42° C. In one embodiment, storage means 15 days at 37° C. In another embodiment storage means 1 or 4 days at 42° C.

In-surfactant-stability may be determined in the presence of at least one anionic and/or at least one non-ionic surfactant. At least one anionic surfactant may be selected from compounds according to general formula (I) as disclosed herein and from compounds according to general formula (II) as disclosed herein. At least one non-ionic surfactant may be selected from compounds according to general formula (III) as disclosed herein.

In one embodiment, increased in-surfactant-stability means in-detergent-stability herein.

In one embodiment, the fermentation stability of a mannanase variant having improved insurfactant-stability is improved when compared to the parent enzyme.

Fermentation stability according to the invention is the proportion of mannanase enzyme consisting of catalytic domain, linker, and CBD produced by fermentation vs mannanase enzyme that has been endogenously truncated.

Improved fermentation stability herein means that the fermentations stability of a mannanase variant according to the invention is at least 1.5-fold, at least 1.6-fold, at least 2-fold when compared to the parent enzyme.

In one embodiment, fermentation stability means fermentation stability when expressed in bacterial host cell, preferably *Bacillus* host cell, more preferably in *Bacillus subtilis* host cell.

In one embodiment, fermentation stability means fermentation stability at a fermentation temperature in the range of 35° C. to 45° C., preferably at a temperature of 37° C.

In one embodiment, the mannanase variant according to the invention having improved fermentation stability is characterized in having two or more of the positions selected from N341F, F346T, T348S/R/N/M/G, E349T/S/G/D, S352N/G, G356Y/V/T/Q/H/C, and D379V, wherein the numbering is according to SEQ ID NO: 2. In one embodiment, the mannanase having improved fermentation stability comprises (a) one or more amino acid substitutions at a position selected from T348N/G, S352N, and D379V, preferably in combination with
(b) one or more amino acid substitutions selected from N341F, F346T, T348S/R/M, E349T/S/G/D, S352G, and G356Y/V/T/Q/H/C,
wherein amino acid substitutions as defined under (b) are not present when at a corresponding position as defined in (a) a substitution is present, and wherein the numbering is according to SEQ ID NO: 2, and wherein the polypeptide has mannan-degrading activity.

Polynucleotide

The invention relates to a polynucleotide encoding a mannanase variant according to the invention. A polynucleotide encodes a polypeptide at least 75%, at least 80%, at least 85%, at least 90%, at least 91%, at least 92%, at least 93%, at least 94%, at least 95%, at least 96%, at least 97%, at least 98%, or at least 99% identical to SEQ ID NO: 2. In one aspect of the invention, the polynucleotide encodes a polypeptide at least 75%, at least 80%, at least 85%, at least 90%, at least 91%, at least 92%, at least 93%, at least 94%, at least 95%, at least 96%, at least 97%, at least 98%, or at least 99% identical to the sequence according to SEQ ID NO: 3 or SEQ ID NO: 4. The polynucleotide of the invention may have a sequence at least 75%, at least 80%, at least 85%, at least 90%, at least 91%, at least 92%, at least 93%, at least 94%, at least 95%, at least 96%, at least 97%, at least 98%, or at least 99% identical to SEQ ID NO: 1.

A polynucleotide according to the invention encodes a mannanase variant according to the invention which is at least 75% identical to the sequence according to SEQ ID NO: 2 or SEQ ID NO: 3 comprising two or more amino acid substitutions selected from A31, Q89, N96, A119, E264, W289, N312, T348, E349, S352, and D379, wherein the numbering is according to SEQ ID NO: 2 and wherein the polypeptide has mannan-degrading activity. In one embodiment, the polynucleotide further encodes one or more amino acid substitutions selected from D86, L101, S103, K107, N108, N109, A112, N122, A124, S126, S127, N129, S231, I233, S235, D244, H254, K255, S270, Q272, K273, N274, S281, G286, S290, N296, D301, T309, A314, L317, A319, D328I, G329, G330, D331, N341, Y344, F346, G356, M359, Y374, L416, and W432, wherein the numbering is according to SEQ ID NO: 2.

In one embodiment, the polynucleotide encodes a mannanase variant according to the invention which is at least 75% identical to the sequence according to SEQ ID NO: 2 or SEQ ID NO: 3 comprising two or more amino acid substitutions selected from A31V, Q89V, N96D, A119Y/H/T, E264Q/V, W289F/M/H, N312F/Y, T348S/R/N/M/G, E349T/S/D/G, S352N/G, and D379V, wherein the numbering is according to SEQ ID NO: 2 and wherein the polypeptide has mannan-degrading activity.

In one embodiment, the polynucleotide encodes a mannanase variant according to the invention which is at least 75% identical to the sequence according to SEQ ID NO: 2 or SEQ ID NO: 3 comprising the amino acid substitutions Q89V and N96D and one or more amino acid substitutions selected from A31V, A119Y/H/T, E264Q/V, W289F/M/H, N312F/Y, T348S/R/N/M/G, E349T/S/D/G, S352N/G and D379V, wherein the numbering is according to SEQ ID NO: 2.

In one embodiment, the polynucleotide encodes a mannanase variant according to the invention which is at least 75% identical to the sequence according to SEQ ID NO: 2 or SEQ ID NO: 3 comprising the amino acid substitutions Q89V and N96D and A119Y/H/T and one or more amino acid substitutions selected from A31V, E264Q/V, W289F/M/H, N312F/Y, T348S/R/N/M/G, E349T/S/D/G, S352N/G and D379V, wherein the numbering is according to SEQ ID NO: 2.

In one embodiment, the polynucleotide encodes a mannanase variant according to the invention which is at least 75% identical to the sequence according to SEQ ID NO: 2 or SEQ ID NO: 3 comprising the amino acid substitutions Q89V, N96D, and A119Y/H/T, and one or more amino acid substitutions selected from A31V, E264Q/V, W289F/M/H, and N312F/Y.

In one embodiment, the polynucleotide further encodes one or more amino acid substitutions selected from D86N, L101T/V, S103Y/E/A, K107N, N108G, N109Q/A, A112N, N122S, 124E/C/D, S126E, S127A, N129M/L/F, S231Q/K/L/P/Y, I233V, S235H/R/L/Q/N/Y, D244I/V/N, H254W, K255Y/H/R, S270T, Q272I, K273T, N274E/C/Q, S281L, G286E/L/Q/A, S290A, N296H/F/Y, D301E/C/T, T309L, A314P, L317T, A319D/E, D328I/Q/V, G329L/S/V/T, G330P/D/T, D331A/Q, N341F, Y344Q/F/T, F346T, G356Y/V/T/Q/H/C, M359R/Y/C/Q, Y374G/V/A/R/N/P, L416W, and W432P/N/L/R/S/T/G/H/I, wherein the numbering is according to SEQ ID NO: 2.

A polynucleotide of the invention encodes for any of the specific variants which is at least 75% identical to the sequence according to SEQ ID NO: 2 or SEQ ID NO: 3 comprising having the amino acid substitutions as disclosed herein.

A polynucleotide according to the invention encodes a mannanase variant according to the invention which is at least 75% identical to the sequence according to SEQ ID NO: 4 comprising two or more amino acid substitutions selected from A31, Q89, N96, A119, E264, W289, and N312, wherein the numbering is according to SEQ ID NO: 2 and wherein the polypeptide has mannan-degrading activity. In one embodiment, the polynucleotide further encodes one or more amino acid substitutions selected from D86, L101, S103, K107, N108, N109, A112, N122, A124, S126, S127, N129, S231, I233, S235, D244, H254, K255, S270, Q272, K273, N274, S281, G286, S290, N296, D301, T309, A314, L317, and A319, wherein the numbering is according to SEQ ID NO: 2.

In one embodiment, the polynucleotide encodes a mannanase variant according to the invention which is at least 75% identical to the sequence according to SEQ ID NO: 4 comprising two or more amino acid substitutions selected from A31V, Q89V, N96D, A119Y/H/T, E264Q/V, W289F/M/H, and N312F/Y, wherein the numbering is according to SEQ ID NO: 2 and wherein the polypeptide has mannan-degrading activity. In one embodiment, the polynucleotide further encodes one or more amino acid substitutions selected from D86N, L101T/V, S103Y/E/A, K107N, N108G, N109Q/A, A112N, N122S, 124E/C/D, S126E, S127A, N129M/L/F, S231Q/K/L/P/Y, I233V, S235H/R/L/Q/N/Y, D244I/V/N, H254W, K255Y/H/R, S270T, Q272I, K273T, N274E/C/Q, S281L, G286E/L/Q/A, S290A, N296H/F/Y, D301E/C/T, T309L, A314P, L317T, and A319D/E, wherein the numbering is according to SEQ ID NO: 2.

In one embodiment of the invention, the polynucleotide encoding a mannanase variant according to the invention encodes at least one amino acid substitution selected from Q89V and N96D and two or more amino acid substitutions selected from A31V, A119Y/H/T, E264Q/V, W289F/M/H, and N312F/Y.

In one embodiment of the invention, the polynucleotide encoding a mannanase variant according to the invention encodes the amino acid substitutions Q89V and N96D and one or more amino acid substitutions selected from A31V, A119Y/H/T, E264Q/V, W289F/M/H, and N312F/Y.

In one embodiment of the invention, the polynucleotide encoding a mannanase variant according to the invention encodes the amino acid substitutions Q89V, N96D, and A119Y/H/T, and one or more amino acid substitutions selected from A31V, E264Q/V, W289F/M/H, and N312F/Y.

A polynucleotide of the invention encodes for any of the specific variants which is at least 75% identical to the sequence according to SEQ ID NO: 4 comprising having the amino acid substitutions as disclosed herein.

In one aspect of the invention, a polynucleotide encoding a mannanase variant according to the invention, encodes one or more conservative amino acid amino acid substitutions at the following positions: T32S, N37S, F61Y, I80V, Y90W, T91S, K99R, S100N, V125I, L150I, D179N, S183N, Y196F, D206E, D229N, N258D, I323L, N345D, V358I, S370A, N383S, N384S, Q423K, F435Y, D459N, N461S, I463V, V482L, wherein the mannanase variant is at least 75% identical to the sequence according to SEQ ID NO: 2, or SEQ ID NO: 3, or SEQ ID NO: 4, and wherein the numbering is according to SEQ ID NO: 2. The polynucleotide encoding a mannanase variant according to the invention may encode combinations of amino acid substitutions selected from T32S, T91S, K99R, S100N, V125I, D179N, S183N, Y196F, D206E, N258D, V358I, S370A, Q423K, D459N, N461S, V482L. The polynucleotide encoding a mannanase variant according to the invention may comprise combinations of amino acid substitutions selected from T32S, N37S, F61Y, I80V, Y90W, K99R, S100N, V125I, L150I, D179N, S183N, Y196F, D206E, D229N, and I323L. Preferably, polynucleotide encoding a mannanase variant according to the invention encodes one or more conservative amino acid substitutions selected from N37S, F61Y, I80V, Y90W, T91S, L150I, D229N, N258D, I323L, N345D, V358I, S370A, N383S, N384S, Q423K, F435Y, D459N, N461S, I463V, and V482L, wherein the mannanase variant is at least 75% identical to the sequence according to SEQ ID NO: 2, or SEQ ID NO: 3, or SEQ ID NO: 4, and wherein the numbering is according to SEQ ID NO: 2.

In one embodiment, the polynucleotide encoding a mannanase variant according to the invention, encodes one or more amino acid substitutions at the following positions: N39T, T45N, D64Q, S133D, E140S, S168D, A173V, Q202N, S305D, H332D, G335D, A360G, A365V, D372G, Q381N, S391Y, F398L, K433T, E438G, I449T, and K475N, wherein the mannanase variant is at least 75% identical to the sequence according to SEQ ID NO: 2, or SEQ ID NO: 3, or SEQ ID NO: 4, and wherein the numbering is according to SEQ ID NO: 2. The polynucleotide encoding a mannanase variant according to the invention may encode combinations of amino acid substitutions selected from S133D, S168D, A173V, Q202N, S305D, H332D, G335D, A365V, D372G, Q381N, S391Y, E438G, and K475N. The polynucleotide encoding a mannanase variant according to the invention may encode combinations of amino acid substitutions selected from N39T, T45N, D64Q, S133D, E140S, and S168D. Preferably, the polynucleotide encoding a mannanase variant according to the invention encodes one or more amino acid substitutions selected from A360G and I449T, wherein the mannanase variant is at least 75% identical to the sequence according to SEQ ID NO: 2, or SEQ ID NO: 3, and wherein the numbering is according to SEQ ID NO: 2.

In one embodiment, the polynucleotide encoding a mannanase variant according to the invention encodes one or more conserved amino acid regions within their polypeptide sequence.

Conserved amino acid regions herein are characterized in a number of consecutive amino acids being not mutated, wherein the number of consecutive amino acids is 3-10, 4-10, 5 to 10, 6, 7, 8, 9, or 10. One or more conserved amino acid regions may be selected from G76-A77-N78-T79, R81-V83-L84, E115-V116-H117-D118, Y134-W135-I136, A154-N155-E156-W157, A191-G192-W193-G194-Q195, F218-S219-I220-H221-M222-Y223-E224-Y225-A226-G227, N236-I1237-D238, I249-G250-E251-F252-G253, G259-D260-V261-D262-E263, and G276-W277-L278-A279-W280, and wherein the numbering is according to SEQ ID NO: 2.

Method to Improve In-Surfactant-Stability

The invention, in one aspect, relates to a method to increase in-surfactant-stability of a mannanase at least 75% identical to SEQ ID NO: 2, or SEQ ID NO: 3, or SEQ ID NO: 4, by the steps of introducing two or more amino acid substitutions at an amino acid position selected from A31V, D86N, N96D, A119Y/H/T, E264Q/V, W289F/M/H, and N312F/Y, and combinations thereof, wherein the numbering is according to SEQ ID NO:2.

Improved in-surfactant-stability relates to the remaining mannan degrading activity after a certain period of time of storage at a specific temperature which is increased when compared to the parent enzyme. "A certain period of time" may mean 1 or more days, preferably 1 to 15 days, more preferably up to 6 days. "Specific temperature" may mean 37° C. or 42° C. In one embodiment, storage means 15 days at 37° C. In another embodiment storage means 1 or 4 days at 42° C. In one embodiment, storage means up to 6 days at 37° C.

In one aspect of the invention, in-surfactant stability means in-detergent-stability or shelf-life stability. The stability in detergent however means that the detergent comprises surfactants as defined herein. Preferably, the detergent comprises at least one anionic surfactant as disclosed below. In one embodiment, the detergent comprises at least one anionic surfactant and at least one non-ionic surfactant as disclosed below. In one embodiment, the detergent additionally comprises at least one protease as disclosed herein.

In one embodiment, the method is characterized by the steps of introducing the amino acid substitutions Q89V and N96D together with one or more amino acid substitutions selected from A31V, A119Y/H/T, E264Q/V, W289F/M/H, N312F/Y, T348S/R/N/M/G, E349T/S/D/G, S352N/G and D379V, wherein the numbering is according to SEQ ID NO: 2.

In one embodiment, the method is characterized by the steps of introducing the amino acid substitutions Q89V and N96D and A119Y/H/T together with one or more amino acid substitutions selected from A31V, E264Q/V, W289F/M/H, N312F/Y, T348S/R/N/M/G, E349T/S/D/G, S352N/G and D379V, wherein the numbering is according to SEQ ID NO:2.

In one embodiment, the method is characterized by the steps of introducing the amino acid substitutions Q89V, N96D and A119Y/H/T together with one or more amino acid substitutions selected from A31V, E264Q/V, W289F/M/H, and N312F/Y.

In one aspect, the in-surfactant stability of a mannanase variant of the invention is improved in the presence of at least one protease as disclosed herein.

Production of Mannanase

The present invention refers to a method of producing a mannanase variant according to the invention, comprising the steps of
(a) providing a host cell comprising a heterologous nucleic acid construct comprising a polynucleotide encoding the mannanase variant according to the invention by introducing the nucleic acid construct comprising the polynucleotide encoding the mannanase variant according to the invention into the host cell;
(b) cultivating the recombinant host cell of step (a) under conditions conductive for the expression of the polynucleotide; and
(c) optionally, recovering a protein of interest encoded by the polynucleotide.

The present invention also refers to a method of expressing a mannanase variant according to the invention, comprising the steps of
(a) providing a host cell comprising a heterologous nucleic acid construct comprising a polynucleotide encoding the mannanase variant according to the invention by introducing the nucleic acid construct comprising the polynucleotide encoding the mannanase variant according to the invention into the host cell;
(b) cultivating the recombinant host cell of step (a) under conditions conductive for the expression of the polynucleotide; and
(c) optionally, recovering a protein of interest encoded by the polynucleotide.

A polynucleotide encoding a polypeptide may be "expressed". The term "expression" or "gene expression" means the transcription of a specific gene or specific genes or specific nucleic acid construct. The term "expression" or "gene expression" in particular means the transcription of a gene or genes or genetic construct into structural RNA (e.g., rRNA, tRNA) or mRNA with or without subsequent translation of the latter into a protein. The process includes transcription of DNA and processing of the resulting mRNA product.

Nucleic acid construct herein means a nucleic acid molecule, either single- or double-stranded which is isolated from a naturally occurring gene or is modified to contain segments of nucleic acids in a manner that would not otherwise exist in nature or which is synthetic, which comprises one or more control sequences. The term "control sequences" means nucleic acid sequences necessary for expression of a polynucleotide encoding a mannanase of the present invention. Each control sequence may be native or foreign to the polynucleotide encoding the variant or native or foreign to each other. Such control sequences include, but are not limited to, a leader, polyadenylation sequence, pro-peptide sequence, promoter, signal peptide sequence, and transcription terminator. At a minimum, the control sequences include a promoter, and transcriptional and translational stop signals. The control sequences may be provided with linkers for the purpose of introducing specific restriction sites facilitating ligation of the control sequences with the coding region of the polynucleotide encoding a variant.

Industrial production of enzymes usually is done by using expression systems. "Expression system" may mean a host microorganism, expression hosts, host cell, production organism, or production strain and each of these terms can be used interchangeably. In one embodiment, the expression host is selected from the group consisting of: a bacterial expression system, a yeast expression system, a fungal expression system, and a synthetic expression system. The expression host may be a wildtype cell or a recombinant cell, preferably it is a recombinant cell. "Wild-type cells" herein means cells prior to a certain modification. The term "recombinant cell" (also called "genetically modified cell" herein) refers to a cell which has been genetically altered, modified or engineered such it that exhibits an altered, modified or different genotype as compared to the wild-type cell which it was derived from. The "recombinant cell" may comprise an exogenous polynucleotide encoding a certain protein or enzyme and therefore may express said protein or enzyme.

In one embodiment, the invention is directed to a recombinant host cell comprising a polynucleotide encoding the mannanase as described herein.

Examples of expression hosts include but are not limited to: *Aspergillus niger*, *Aspergillus oryzae*, *Hansenula polymorpha*, *Thermomyces lanuginosus*, *Fusarium oxysporum*, *Fusarium heterosporum*, *Escherichia coli*, *Bacillus*, preferably selected from *Bacillus subtilis*, *Bacillus pumilus*, and *Bacillus licheniformis*, *Pseudomonas*, preferably *Pseudomonas fluorescens*, *Pichia pastoris* (also known as *Komagataella phaffii*), *Myceliopthora thermophila* (C1), *Themothelomyces thermophilus*, *Schizosaccharomyces pombe*, *Trichoderma*, preferably *Trichoderma reesei*, and *Saccharomyces*, preferably *Saccharomyces cerevisiae*. The mannanase variant according to the invention may be produced using host cell originating from the microorganisms listed above.

In one embodiment, the bacterial expression system is selected from *E. coli*, *Bacillus*, *Pseudomonas*, and *Streptomyces*. In one embodiment, the yeast expression system is selected from *Candida*, *Pichia*, *Saccharomyces*, and *Schizosaccharomyces*. In one embodiment, the fungal expression system is selected from *Penicillium*, *Aspergillus*, *Fusarium*, *Myceliopthora*, *Rhizomucor*, *Rhizopus*, *Thermomyces*, and *Trichoderma*.

Preferably, the recombinant host cell of the invention is a Gram-positive bacteria including but not limited to, *Bacillus*, *Clostridium*, *Enterococcus*, *Geobacillus*, *Lactobacillus*, *Lactococcus*, *Oceanobacillus*, *Staphylococcus*, *Streptococcus*, and *Streptomyces*. More preferably, the host cell is a *Bacillus* cell, more preferably selected from the group of *Bacillus alkalophius*, *Bacillus amyloliquefaciens*, *Bacillus brevis*, *Bacillus circulans*, *Bacillus clausii*, *Bacillus coagulans*, *Bacillus firmus*, *Bacillus jautus*, *Bacillus lentus*, *Bacillus licheniformis*, *Bacillus megaterium*, *Bacillus pumilus*, *Bacillus stearothermophilus*, *Bacillus subtilis*, and *Bacillus thuringiensis*. Most preferred, the *Bacillus* cell is selected from *Bacillus subtilis*, *Bacillus pumilus*, *Bacillus licheniformis*, and *Bacillus lentus*. In one embodiment, the *Bacillus* cell is a *Bacillus subtilis* cell.

The invention provides a fermentation method for producing a fermentation product, comprising the steps of
a) providing a recombinant host cell according to the invention, and
b) cultivating the recombinant host cell under conditions allowing for the expression of polynucleotide encoding a mannanase of the invention.

The term "heterologous" (or exogenous or foreign or recombinant) in the context of polynucleotides and polypeptides is defined herein as:
(a) not native to the host cell; or
(b) native to the host cell but structural modifications, e.g., deletions, substitutions, and/or insertions, are included as a result of manipulation of the DNA of the host cell by recombinant DNA techniques to alter the native sequence; or
(c) native to the host cell but expression is quantitatively altered or expression is directed from a genomic location different from the native host cell as a result of manipulation of the DNA of the host cell by recombinant DNA techniques, e.g., a stronger promoter.

Preferably, "Heterologous" Herein Means "not Native to the Host Cell".

The invention in one aspect relates to a host cell, preferably a *Bacillus* host cell, expressing a polynucleotide which encodes a polypeptide at least 75% identical to SEQ ID NO: 2, or SEQ ID NO: 3, or SEQ ID NO: 4 comprising amino acid substitutions as disclosed above.

In one embodiment, the host cell expresses a polynucleotide encoding a mannanase variant at least 75% identical to SEQ ID NO: 2 or SEQ ID NO: 3 having amino acid substitutions in one or more of the positions selected from N341F, F346T, T348S/R/N/M/G, E349T/S/G/D, S352N/G, G356Y/V/T/Q/H/C, and D379V, wherein the numbering is according to SEQ ID NO: 2.

In one embodiment, the invention is directed to a genetic construct comprising a polynucleotide encoding the mannanase of the invention. "Genetic Construct" or "expression cassette" or "expression construct" as used herein, is a DNA molecule composed of at least one polynucleotide sequence of the invention to be expressed, operably linked to one or more control sequences (at least to a promoter) as described herein. Typically, the expression cassette comprises three elements: a promoter sequence, an open reading frame, and a 3' untranslated region that, in eukaryotes, usually contains a polyadenylation site.

Examples of suitable promoters for directing transcription of the nucleic acid constructs of the present invention in a bacterial host cell are the promoters obtained from *Bacillus amyloliquefaciens* alpha-amylase gene (amyQ), *Bacillus licheniformis* alpha-amylase gene (amyl), *Bacillus licheniformis* penicillase gene (penP), *Bacillus stearothermophilus* maltogenic amylase gene (amyM), *Bacillus subtilis* levansucrase gene (sacB), *Bacillus subtilis* xylA and xylB genes, *Bacillus thurigiensis* cryIIIA gene (Agaisse and Lereclus, 1994, Molecular Biology 13: 97-107), *E. coli* lac operon, *E. coli* trc promoter (Egon et at 1988, Gene 69: 301-315), *Streptomyces coelicolor* agarose gene (dagA), and prokaryotic beta-lactamase gene (Villa-Kamaroff et al 1978, Proc. Natl. Acad. Sci USA 75: 3727-3731), as well as tac promoter (DaBoer et al 1983, Proc. Natl. Acad. Sci USA 80: 21-25. Further useful promoters are described in "Useful proteins from recombinant bacteria" in Gilbert et al 1980, Scientific American 242: 74-94; and in Sambrook, J. et al. 1989, Molecular Cloning: A Laboratory Manual, 2nd Ed., Cold Spring Harbor Laboratory Press, Cold Spring Harbor, NY.

Additional regulatory elements may include transcriptional as well as translational enhancers. An intron sequence may also be added to the 5' untranslated region (UTR) or in the coding sequence to increase the amount of the mature message that accumulates in the cytosol. The expression cassette may be part of a vector or may be integrated into the genome of a host cell and replicated together with the genome of its host cell. The expression cassette usually is capable of increasing or decreasing expression.

The term "vector" as used herein comprises any kind of construct suitable to carry foreign polynucleotide sequences for transfer to another cell, or for stable or transient expression within a given cell. The term "vector" as used herein encompasses any kind of cloning vehicles, such as but not limited to plasmids, phagemids, viral vectors (e.g., phages), bacteriophage, baculoviruses, cosmids, fosmids, artificial chromosomes, or and any other vectors specific for specific hosts of interest. Low copy number or high copy number vectors are also included. Foreign polynucleotide sequences usually comprise a coding sequence which may be referred to herein as "gene of interest". The gene of interest may comprise introns and exons, depending on the kind of origin or destination of host cell.

A vector as used herein may provide segments for transcription and translation of a foreign polynucleotide upon transformation into a host cell or host cell organelles. Such additional segments may include regulatory nucleotide sequences, one or more origins of replication that is required for its maintenance and/or replication in a specific cell type, one or more selectable markers, a polyadenylation signal, a suitable site for the insertion of foreign coding sequences such as a multiple cloning site etc. One example is when a vector is required to be maintained in a bacterial cell as an episomal genetic element (e.g. plasmid or cosmid molecule). Non-limiting examples of suitable origins of replication include the f1-ori and colE1. A vector may replicate without integrating into the genome of a host cell, e.g. as a plasmid in a bacterial host cell, or it may integrate part or all of its DNA into the genome of the host cell and thus lead to replication and expression of its DNA.

Foreign nucleic acid may be introduced into a vector by means of cloning. Cloning may mean that by cleavage of the vector (e.g. within the multiple cloning site) and the foreign polynucleotide by suitable means and methods (e.g., restriction enzymes), fitting structures within the individual nucleic acids may be created that enable the controlled fusion of said foreign nucleic acid and the vector. Once introduced into the vector, the foreign nucleic acid comprising a coding sequence is suitable to be introduced (transformed, transduced, transfected, etc.) into a host cell or host cell organelles. A cloning vector may be chosen suitable for expression of the foreign polynucleotide sequence in the host cell or host cell organelles.

The term "introduction" or "transformation" as referred to herein encompasses the transfer of an exogenous polynucleotide into a host cell, irrespective of the method used for transfer. That is, the term "transformation" as used herein is independent from vector, shuttle system, or host cell, and it not only relates to the polynucleotide transfer method of transformation as known in the art (cf., for example, Sambrook, J. et al. (1989) Molecular Cloning: A Laboratory Manual, 2nd Ed., Cold Spring Harbor Laboratory Press, Cold Spring Harbor, NY), but it encompasses any further kind polynucleotide transfer methods such as, but not limited to, transduction or transfection. Plant tissue capable of subsequent clonal propagation, whether by organogenesis or embryogenesis, may be transformed with a genetic construct and a whole plant regenerated therefrom. The particular tissue chosen will vary depending on the clonal propagation systems available for, and best suited to, the particular species being transformed. In one embodiment of the invention, a vector is used for transformation of a host cell.

The polynucleotide of the invention may be transiently or stably introduced into a host cell preferably a *Bacillus* host cell, and may be maintained non-integrated, for example, as a plasmid. "Stable transformation" means that the transformed cell or cell organelle passes the nucleic acid comprising the foreign coding sequence on to the next generations of the cell or cell organelles. Usually stable transformation is due to integration of nucleic acid comprising a foreign coding sequence into the chromosomes or as an episome (separate piece of nuclear DNA). "Transient transformation" means that the cell or cell organelle once transformed expresses the foreign nucleic acid sequence for a certain time—mostly within one generation. Usually transient transformation is due to nucleic acid comprising a foreign nucleic acid sequence is not integrated into the chromosomes or as an episome. Alternatively, it is integrated into the host genome.

Enzymes are usually produced as a liquid concentrate, frequently derived from a fermentation broth. "Liquid enzyme concentrate" herein means any liquid enzyme-comprising product comprising at least one enzyme. "Liquid" in the context of enzyme concentrate is related to the physical appearance at 20° C. and 101.3 kPa.

The liquid enzyme concentrate may result from dissolution of solid enzyme in solvent. The solvent may be selected from water and an organic solvent. A liquid enzyme concentrate resulting from dissolution of solid enzyme in solvent may comprise amounts of enzyme up to the saturation concentration.

Dissolution herein means, that solid compounds are liquified by contact with at least one solvent. Dissolution means complete dissolution of a solid compound until the saturation concentration is achieved in a specified solvent, wherein no phase-separation occurs.

In one aspect of the invention, the enzyme concentrate may be essentially free of water, meaning that no significant amounts of water are present. Non-significant amounts of water herein means, that the enzyme concentrate comprises less than 25%, less than 20%, less than 15%, less than 10%, less than 7%, less than 5%, less than 4%, less than 3%, less than 2% by weight water, all relative to the total weight of the enzyme concentrate, or no water. In one embodiment, enzyme concentrate free of water means that the enzyme concentrate does not comprise significant amounts of water but does comprise organic solvents in amounts of 30-80% by weight, relative to the total weight of the enzyme concentrate.

Liquid enzyme concentrates comprising water may be called "aqueous enzyme concentrates". In one embodiment, "aqueous enzyme concentrates" are enzyme-comprising solutions, wherein solid enzyme product has been dissolved in water. In one embodiment "aqueous enzyme concentrate" means enzyme-comprising products resulting from enzyme production by fermentation.

Fermentation means the process of cultivating recombinant cells which express the desired enzyme in a suitable nutrient medium allowing the recombinant host cells to grow and express the desired protein. At the end of the fermentation, fermentation broth usually is collected and further processed, wherein the fermentation broth comprises a liquid fraction and a solid fraction. Depending on whether the enzyme has been secreted into the liquid fraction or not, the desired protein or enzyme may be recovered from the liquid fraction of the fermentation broth or from cell lysates. Recovery of the desired enzyme uses methods known to those skilled in the art. Suitable methods for recovery of proteins or enzymes from fermentation broth include but are not limited to collection, centrifugation, filtration, extraction, and precipitation.

Aqueous enzyme concentrates resulting from fermentation may comprise amounts of enzyme in the range of 0.1% to 40% by weight, or 0.5% to 30% by weight, or 1% to 25% by weight, or 3% to 25% by weight, or 5% to 25% by weight, all relative to the total weight of the enzyme concentrate.

Aqueous enzyme concentrates resulting from fermentation may comprise water in amounts of more than about 50% by weight, more than about 60% by weight, more than about 70% by weight, or more than about 80% by weight, all relative to the total weight of the enzyme concentrate. Aqueous enzyme concentrates which result from fermentation, may comprise residual components such as salts originating from the fermentation medium, cell debris originating from the production host cells, metabolites produced by the production host cells during fermentation. In one embodiment, residual components may be comprised in liquid enzyme concentrates in amounts less than 30% by weight, less than 20% by weight less, than 10% by weight, or less than 5% by weight, all relative to the total weight of the aqueous enzyme concentrate.

Enzymes tend to lose enzymatic activity if remaining in an aqueous environment and so it is conventional practice to convert it to an anhydrous form: aqueous concentrates may be lyophilized or spray-dried e.g. in the presence of a carrier material to form aggregates. Usually, solid enzyme products need to be "dissolved" prior to use. To stabilize enzymes in liquid products enzyme inhibitors are usually employed, preferably reversible enzyme inhibitors, to inhibit enzyme activity temporarily until the enzyme inhibitor is released.

Enzyme Preparation

An enzyme preparation of the invention is preferably liquid. "Liquid" in the context of enzyme preparation is related to the physical appearance at 20° C. and 101.3 kPa.

The enzyme preparation of the invention comprises a liquid enzyme concentrate comprising at least one mannanase variant according to the invention. An enzyme preparation of the invention comprises only components effective in stabilizing the enzyme preparation or the enzyme comprised therein, e.g. selected from at least one enzyme stabilizer, at least one compound stabilizing the liquid enzyme preparation as such, and at least one solvent.

Liquid enzyme preparations of the invention are preferably free from surfactants. In one embodiment, free from surfactants means, that no actively added surfactants are comprised in enzyme preparations of the invention. This means that enzyme preparations of the invention may comprise surfactants which result from the fermentation process from which the enzyme concentrate originates (as a by-product).

Liquid enzyme preparations of the invention are preferably free from complexing agents. In one embodiment, free from complexing agents means, that no actively added complexing agents are comprised in enzyme preparations of the invention. This means that enzyme preparations of the invention may comprise complexing agents which result from the fermentation process from which the enzyme concentrate originates (as a by-product).

In one embodiment, liquid enzyme preparations of the invention are free from surfactants and free from complexing agents.

In one aspect, the invention provides a liquid enzyme preparation comprising a mannanase variant according to the invention which is at least 75% identical to SEQ ID NO: 2 or SEQ ID NO: 3, or SEQ ID NO: 4, and at least one further enzyme selected from the group consisting of proteases, amylases, cellulases, lipases, xylanases, mannanases different from the mannanase variants according to the invention, cutinases, esterases, phytases, DNAses, pectinases, pectate lyases, pectinolytic enzymes, carbohydrases, arabinases, galactanases, xanthanases, xyloglucanases, laccases, peroxidases and oxidases.

In one embodiment, the enzyme preparation comprises besides at least one mannanase variant according to the invention at least one subtilisin protease. Subtilisin herein refers to a serine protease having the catalytic triad of subtilisin related proteases. Examples include the subtilisins as described in WO 89/06276 and EP 0283075, WO 89/06279, WO 89/09830, WO 89/09819, WO 91/06637 and WO 91/02792.

For the purpose of the invention, at least one protease may be selected from the following: subtilisin from *Bacillus amyloliquefaciens* BPN' (described by Vasantha et al. (1984) J. Bacteriol. Volume 159, p. 811-819 and JA Wells et al. (1983) in Nucleic Acids Research, Volume 11, p. 7911-7925); subtilisin from *Bacillus licheniformis* (subtilisin Carlsberg; disclosed in E L Smith et al. (1968) in J. Biol Chem, Volume 243, pp. 2184-2191, and Jacobs et al. (1985) in Nucl. Acids Res, Vol 13, p. 8913-8926); subtilisin PB92 (original sequence of the alkaline protease PB92 is described in EP 283075 A2); subtilisin 147 and/or 309 (Esperase®, Savinase®, respectively) as disclosed in WO 89/06279; subtilisin from *Bacillus lentus* as disclosed in WO 91/02792, such as from *Bacillus lentus* DSM 5483 or the variants of *Bacillus lentus* DSM 5483 as described in WO 95/23221; subtilisin from *Bacillus alcalophilus* (DSM 11233) disclosed in DE 10064983; subtilisin from *Bacillus gibsonii* (DSM 14391) as disclosed in WO 2003/054184; subtilisin from *Bacillus* sp. (DSM 14390) disclosed in WO 2003/056017; subtilisin from *Bacillus* sp. (DSM 14392) disclosed in WO 2003/055974; subtilisin from *Bacillus gibsonii* (DSM 14393) disclosed in WO 2003/054184; subtilisin having SEQ ID NO: 4 as described in WO 2005/063974; subtilisin having SEQ ID NO: 4 as described in WO 2005/103244; subtilisin having SEQ ID NO: 7 as described in WO 2005/103244; and subtilisin having SEQ ID NO: 2 as described in application DE 102005028295.4.

Examples of useful proteases in accordance with the present invention comprise the variants described in: WO 92/19729, WO 95/23221, WO 96/34946, WO 98/20115, WO 98/20116, WO 99/11768, WO 01/44452, WO 02/088340, WO 03/006602, WO 2004/03186, WO 2004/041979, WO 2007/006305, WO 2011/036263, WO 2011/036264, and WO 2011/072099. Suitable examples comprise especially protease variants of subtilisin protease derived from SEQ ID NO:22 as described in EP 1921147 (which is the sequence of mature alkaline protease from *Bacillus lentus* DSM 5483) with amino acid substitutions in one or more of the following positions: 3, 4, 9, 15, 24, 27, 33, 36, 57, 68, 76, 77, 87, 95, 96, 97, 98, 99, 100, 101, 102, 103, 104, 106, 118, 120, 123, 128, 129, 130, 131, 154, 160, 167, 170, 194, 195, 199, 205, 206, 217, 218, 222, 224, 232, 235, 236, 245, 248, 252 and 274 (according to the BPN' numbering), which have proteolytic activity. In one embodiment, such a subtilisin protease is not mutated at positions Asp32, His64 and Ser221 (according to BPN' numbering).

At least one subtilisin may have SEQ ID NO:22 as described in EP 1921147 (which may be called BLAP WT herein) or is a variant thereof which is at least 80% identical SEQ ID NO:22 as described in EP 1921147 and has proteolytic activity. In one embodiment, a subtilisin is at least 80% identical to SEQ ID NO:22 as described in EP 1921147 and is characterized by having amino acid glutamic acid (E), or aspartic acid (D), or asparagine (N), or glutamine (Q), or alanine (A), or glycine (G), or serine (S) at position 101 (according to BPN' numbering) and has proteolytic activity. In one embodiment, subtilisin is at least 80% identical to SEQ ID NO:22 as described in EP 1921147 and is characterized by having amino acid glutamic acid (E), or aspartic acid (D), at position 101 (according to BPN' numbering) and has proteolytic activity. Such a subtilisin variant may comprise an amino acid substitution at position 101, such as R101E or R101D, alone or in combination with one or more substitutions at positions 3, 4, 9, 15, 24, 27, 33, 36, 57, 68, 76, 77, 87, 95, 96, 97, 98, 99, 100, 101, 102, 103, 104, 106, 118, 120, 123, 128, 129, 130, 131, 154, 160, 167, 170, 194, 195, 199, 205, 206, 217, 218, 222, 224, 232, 235, 236, 245, 248, 252 and/or 274 (according to BPN' numbering) and has proteolytic activity. In one embodiment, said protease comprises one or more further substitutions: (a) threonine at position 3 (3T), (b) isoleucine at position 4 (4I), (c) alanine, threonine or arginine at position 63 (63A, 63T, or 63R), (d) aspartic acid or glutamic acid at position 156 (156D or 156E), (e) proline at position 194 (194P), (f) methionine at position 199 (199M), (g) isoleucine at position 205 (205I), (h) aspartic acid, glutamic acid or glycine at position 217 (217D, 217E or 217G), (i) combinations of two or more amino acids according to (a) to (h).

Suitable proteases include also those, which are variants of the above described proteases which have proteolytic activity. In one embodiment protease variants include variants with at least 40 to 100% identity to the full length polypeptide sequence of the parent enzyme as disclosed above. In one embodiment protease variants having proteolytic activity are at least 70%, at least 75%, at least 80%, at least 85%, at least 90%, at least 91%, at least 92%, at least 93%, at least 94%, at least 95%, at least 96%, at least 97%, at least 98% or at least 99% identical to the full length polypeptide sequence of the parent enzyme as disclosed above.

In another embodiment, the invention relates to protease variants comprising conservative mutations not pertaining the functional domain of the respective protease. Protease variants of this embodiment having proteolytic activity may be at least 70%, at least 75%, at least 80%, at least 85%, at least 90%, at least 91%, at least 92%, at least 93%, at least 94%, at least 95%, at least 96%, at least 97%, at least 98% or at least 99% similar to the full length polypeptide sequence of the parent enzyme.

In one embodiment, protease variants have proteolytic activity according to the present invention when said protease variants exhibit increased proteolytic activity when compared to the parent protease.

In one embodiment, protease variants have proteolytic activity according to the present invention when said protease variants exhibit at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or 100% of the proteolytic activity of the respective parent protease.

A suitable subtilisin may be at least 80% identical to SEQ ID NO:22 as described in EP 1921147 and is characterized by comprising one amino acid (according to (a)-(h)) or combinations according to (i) together with the amino acid 101E, 101D, 101N, 101Q, 101A, 101G, or 101S (according to BPN' numbering) and has proteolytic activity.

In one embodiment, a subtilisin is at least 80% identical to SEQ ID NO:22 as described in EP 1921147 and is characterized by comprising the mutation (according to BPN' numbering) R101E, or S3T+V4I+V205I, or S3T+V4I+R101E+V205I or S3T+V4I+V199M+V205I+L217D, and has proteolytic activity.

In another embodiment, the subtilisin comprises an amino acid sequence having at least 80% identity to SEQ ID NO:22 as described in EP 1921147 and being further characterized by comprising S3T+V4I+S9R+A15T+V68A+D99S+R101S+A103S+I104V+N218D (according to the BPN' numbering) and has proteolytic activity.

A subtilisin may have an amino acid sequence being at least 80% identical to SEQ ID NO:22 as described in EP 1921147 and being further characterized by comprising R101E, and one or more substitutions selected from the group consisting of S156D, L262E, Q137H, S3T, R45E,D, Q, P55N, T58W,Y,L, Q59D,M,N,T, G61 D,R, S87E, G97S, A98D,E,R, S106A,W, N117E, H120V,D,K,N, S125M, P129D, E136Q, S144W, S161T, S163A,G, Y171 L, A172S, N185Q, V199M, Y209W, M222Q, N238H, V244T, N261T,D and L262N,Q,D (as described in WO 2016/096711 and according to the BPN' numbering), and has proteolytic activity.

In one aspect, the invention provides a liquid enzyme preparation comprising a mannanase variant according to the invention which is at least 75% identical to SEQ ID NO: 2, preferably a mannanase at least 75% identical to a sequence according to SEQ ID NO: 3, at least one compound stabilizing the liquid enzyme preparation as such, at least one solvent, and optionally at least one enzyme stabilizer.

Compounds Stabilizing the Liquid Enzyme Preparation as Such

Compounds stabilizing the liquid enzyme preparation as such means any compound except enzyme stabilizers needed to establish storage stability of a liquid preparation in amounts effective to ensure the storage stability.

Storage stability in the context of liquid preparations to those skilled in the art usually includes aspects of appearance of the product and uniformity of dosage.

Appearance of the product is influenced by the pH of the product and by the presence of compounds such as preservatives, antioxidants, viscosity modifiers, emulsifiers etc.

Uniformity of dosage is usually related to the homogeneity of a product.

Inventive enzyme preparations may be alkaline or exhibit a neutral or slightly acidic pH value.

The enzyme preparation may have a pH in the range of 5-12, preferably in the range of 6-11, more preferably in a range selected from 6-10, 7-9, and 7.5-8.5.

The liquid enzyme preparation of the invention may comprise at least one preservative. Preservatives are added in amounts effective in preventing microbial contamination of the liquid enzyme preparation, preferably the aqueous enzyme preparation.

One or more preservatives as known to those skilled in the art may be added to the enzyme preparation in a concentration of 0.0001 to 10% relative to the total weight of the enzyme preparation.

The invention in one aspect pertains to a method of preserving an aqueous enzyme preparation according to the invention against microbial contamination or growth, which method comprises addition of an antimicrobial agent selected from the group consisting of
  2-phenoxyethanol in a concentration of 0.01% to 5%, more preferably 0.1% to 2%, glutaraldehyde in a concentration of 2 ppm to 5000 ppm, more preferably 10 ppm to 2000 ppm,
  2-bromo-2-nitropropane-1,3-diol in a concentration of 5 ppm to 5000 ppm, more preferably 20 ppm to 1000 ppm,
  formic acid in acid form or as its salt in a concentration of 0.01% to 3%, more preferably 0.05% to 0.5% and
  4,4'-dichloro 2-hydroxydiphenyl ether in a concentration of 0.001% to 1%, more preferably 0.002% to 0.6%
to an aqueous enzyme concentrate comprising a mannanase variant according to the invention.

In one embodiment, liquid enzyme preparations of the invention are free from preservatives, meaning that preservatives are comprised in amounts less than 1 ppm. In one embodiment, "free from preservatives" means, that no actively added preservatives are comprised in enzyme preparations of the invention. This means that enzyme preparations may comprise preservatives which result from the fermentation process from which the enzyme concentrate originates (as a by-product).

Solvents

In one embodiment, the inventive enzyme preparation is aqueous, comprising water in amounts in the range of 5% to 95% by weight, in the range of 5% to 30% by weight, in the range of 5% to 25% by weight, or in the range of 20% to 70% by weight, all relative to the total weight of the enzyme preparation.

In one embodiment, the enzyme preparation of the invention comprises at least one organic solvent selected from ethanol, n-propanol, iso-propanol, n-butanol, iso-butanol, sec.-butanol, ethylene glycol, propylene glycol, 1,3-propane diol, butane diol, glycerol, diglycol, propyl diglycol, butyl diglycol, hexylene glycol, ethylene glycol methyl ether, ethylene glycol ethyl ether, ethylene glycol propyl ether, and phenoxyethanol, preferred are ethanol, isopropanol or propylene glycol. Further, the enzyme preparation of the invention may comprise at least one organic solvent selected from compounds such as 2-butoxyethanol, isopropyl alcohol, and d-limonene.

In a preferred embodiment, enzyme preparations of the invention comprise at least one water miscible organic solvent. Water miscibility in this context means the property of the organic solvent to mix in all proportions in water, forming a homogeneous solution. Preferably, at least one water miscible solvent is selected from ethanol, isopropanol or 1,2-propylene glycol.

In one embodiment, enzyme preparations of the invention comprise
  (a) amounts of water in the range of about 20% to 50% and
  (b) at least one organic solvent in amounts in the range of 30% to 60% by weight, or in amounts in the range of 45% to 55% by weight, all relative to the total weight of the enzyme preparation.

In one embodiment, enzyme preparations of the invention comprise organic solvents in amounts in the range of 0% to 20% by weight relative to the total weight of the enzyme preparation. Preferably, enzyme preparations of the invention comprise amounts of water in the range of about 30% to 80% by weight and at least one organic solvent in amounts of less than 10% by weight, less than 5% by weight, or less than 1% by weight, all relative to the total weight of the enzyme preparation.

In one embodiment, the enzyme preparation comprises water in amounts in the range of 5% to 15% by weight and no significant amounts of organic solvent, for example 1% by weight or less, all relative to the total weight of the enzyme preparation.

Enzyme Stabilizer

Stabilization of an enzyme relates to stability in the course of time (e.g. storage stability), thermal stability, pH stability, and chemical stability. The term "enzyme stability" herein preferably relates to the retention of enzymatic activity as a function of time e.g. during storage or operation. Enzyme stabilizers stabilize an enzyme in liquid, preferably aqueous environment, meaning that it reduced or avoids loss of enzymatic activity in the course of time.

In one embodiment, at least one enzyme, preferably at least one mannanase variant according to the invention, is stabilized by the presence of water-soluble sources of calcium and/or magnesium ions within the enzyme preparation.

In one embodiment, at least one enzyme stabilizer is selected from polyols or water-soluble salts.

Polyols may be selected from polyols containing from 2 to 6 hydroxyl groups. Suitable examples include glycol, 1,2-propane diol, 1,3-propane diol, 1,2-butane diol, 1,4-butane diol, 1,2-pentandiol, 1,6-hexane diol, ethylene glycol, hexylene glycol, glycerol, sorbitol, mannitol, erythriol, glucose, fructose, and lactose.

Water-soluble salts may be selected from salts like NaCl or KCl, and alkali salts of lactic acid and formic acid.

In an embodiment of the invention, water-soluble salts may be selected from water-soluble sources of zinc (II), calcium (II) and/or magnesium (II) ions in the finished compositions that provide such ions to the enzymes, as well as other metal ions (e.g. barium (II), scandium (II), iron (II), manganese (II), aluminum (III), Tin (II), cobalt (II), copper (II), Nickel (II), and oxovanadium (IV)). Preferably, the water-soluble salt is selected from $CaCl_2$ and $MgCl_2$.

In one embodiment, the enzyme preparation comprises a protease, preferably a serine protease (EC 3.4.21), more preferably a subtilisin EC 3.4.21.62; and/or a lipase, preferable a triacylglycerol lipase (EC 3.1.1.3), more preferably a *Thermomyces lanuginosus* lipase. An enzyme stabilizer, in this context may be selected from boron-containing compounds, polyols, peptide aldehydes, other stabilizers, and mixtures thereof.

A boron-containing compound may be selected from boric acid or its derivatives and from boronic acid or its derivatives such as aryl boronic acids or its derivatives, from salts thereof, and from mixtures thereof. Boric acid herein may be called orthoboric acid.

In one embodiment, a boron-containing compound is selected from the group consisting of aryl boronic acids and its derivatives. In one embodiment, a boron-containing compound is selected from the group consisting of benzene boronic acid (BBA) which is also called phenyl boronic acid (PBA), derivatives thereof, and mixtures thereof.

In one embodiment a phenyl-boronic acid derivative is selected from the group consisting of 4-formyl phenyl boronic acid (4-FPBA), 4-carboxy phenyl boronic acid (4-CPBA), 4-(hydroxymethyl) phenyl boronic acid (4-HMPBA), and p-tolylboronic acid (p-TBA).

In one embodiment, the enzyme preparations, preferably those additionally comprising a subtilisin protease, comprises about 0.1-2% by weight relative to the total weight of the enzyme preparation of at least one boron-containing compound. Preferably, the enzyme preparation comprises about 0.15-1%, or 0.2-0.5%, or about 0.3% by weight relative to the total weight of the enzyme preparation of at least one boron-containing compound. More preferably, the enzyme preparation comprises about 0.3% by weight relative to the total weight of the enzyme preparation of 4-FPBA.

In one embodiment, at least one enzyme stabilizer is selected from peptide stabilizer. At least one peptide stabilizer may be selected from a compound of formula (D):

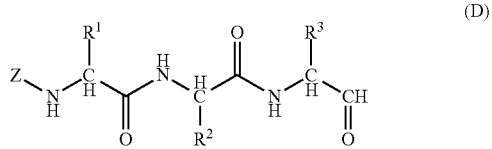

(D)

$R^1$, $R^2$, $R^3$, $R^4$, $R^5$ and Z within formula (D) are defined as follows:

$R^1$, $R^2$ and $R^3$ are each independently selected from the group consisting of hydrogen, optionally substituted $C_{1-8}$ alkyl, optionally substituted $C_{2-6}$ alkenyl, optionally substituted $C_{1-8}$ alkoxy, optionally substituted 3- to 12-membered cycloalkyl, and optionally substituted 6- to 10-membered aryl; or wherein each $R^1$, $R^2$ and $R^3$ is independently selected as —$(CH_2)_3$— which is also attached to the nitrogen atom of —NH—C(H)— so that —N—C(H)$R^{1,\ 2\ or\ 3}$-forms a 5-membered heterocyclic ring;

$R^4$ and $R^5$ are each independently selected from the group consisting of hydrogen, optionally substituted $C_{1-8}$ alkyl, optionally substituted $C_{2-6}$ alkenyl, optionally substituted $C_{1-8}$ alkoxy, optionally substituted $C_{1-4}$ acyl, optionally substituted $C_{1-8}$ alkyl phenyl (e.g. benzyl), and optionally substituted 6- to 10-membered aryl; or wherein $R^4$ and $R^5$ are joined to form an optionally substituted 5- or 6-membered ring;

Z is selected from hydrogen, an N-terminal protection group, and one or more amino acid residues optionally comprising an N-terminal protection group.

In a preferred embodiment, the peptide stabilizer is selected from compounds according to formula (D), wherein $R^1$ and $R^2$ is a group such that NH—$CHR^1$—CO and NH—$CHR^2$—CO each is an L or D-amino acid residue selected from Ala, Cys, Gly, Pro, Ser, Thr, Val, Nva or Nle, and $R^3$ is a group such that NH—$CHR^3$—CO is an L or D-amino acid residue selected from Tyr, m-tyrosine, 3,4-dihydroxyphenylalanine, Phe, Val, Ala, Met, Nva, Leu, Ile or Nle; preferably with $R^1$ being Val, $R^2$ being being Ala and $R^3$ being Leu and the N-terminal protection group Z is selected from benzyloxycarbonyl (Cbz), p-methoxybenzyl carbonyl (MOZ), benzyl (Bn), benzoyl (Bz), p-methoxybenzyl (PMB), p-methoxyphenyl (PMP), formyl, acetyl (Ac), methyloxy, alkoxycarbonyl, methoxycarbonyl, fluorenylmethyloxycarbonyl (Fmoc), or tert-butyloxycarbonyl (Boc); preferably Z is benzyloxycarbonyl (Cbz).

The enzyme preparations of the invention, preferably those additionally comprising a subtilisin protease, may comprise a total amount of peptide stabilizer in the range from about 0.05% to 2%, in the range from about 0.08% to 1%, or in the range from 0.1 to 0.5% by weight, all relative to the total weight of the enzyme preparation. Preferably, the enzyme preparation comprises about 0.3% by weight relative to the total weight of the enzyme preparation of a peptide stabilizer as disclosed above.

Mannanase Application

In one aspect, the invention relates to a formulation preferably having a pH in the range of 5-12 comprising at least one mannanase variant according to the invention.

The invention in one aspect relates to the use of the mannanase variants according to the invention to be formulated into detergent formulations such as I&I and homecare formulations for laundry and hard surface cleaning, wherein at least a mannanase variant according to the invention and at least one detergent component are mixed in no specified order in one or more steps with one or more detergent components. Therefore, the detergent formulations of the invention comprise at least one mannanase variant of the invention. In one embodiment, a mannanase variant according to the invention is comprised in a liquid enzyme preparation.

In one embodiment, at least one mannanase of the invention is comprised in the detergent formulations of the invention in amounts of about 0.0005% to 0.005%, or 0.0005% to 0.002% by weight, all relative to the total weight of the detergent formulation and wherein the amount relates to 100% active content of the enzyme.

In one embodiment, the formulation has a pH in the range of 6-11, more preferably in a range selected from 6-10, 7-9, and 7.5-8.5. In one embodiment, the formulation is a detergent formulation, preferably a liquid detergent formulation.

A detergent formulation according to the invention comprises one or more detergent component(s). The component (s) chosen depend on the desired washing or cleaning application and/or physical form of the detergent formulation.

The term "detergent component" is defined herein to mean any types of ingredient, which is suitable for detergent formulation, such as surfactants, building agents, polymers, bleaching systems. Any component(s) known in the art acknowledging their known characteristics are suitable detergent component(s) according to the invention. Detergent components in one embodiment means components which provide washing or cleaning performance, or which effectively aid the processing (maintain physical characteristics during processing, storage and use; e.g. rheology modifiers, hydrotropes, desiccants) when present in effective amounts.

Usually, a detergent formulation is a complex formulation of more than two detergent components.

Detergent components may have more than one function in the final application of a detergent formulation, therefore any detergent component mentioned in the context of a specific function herein, may also have another function in the final application of a detergent formulation. The function of a specific detergent component in the final application of a detergent formulation usually depends on its amount within the detergent formulation, i.e. the effective amount of a detergent component.

The term "effective amount" includes amounts of individual components to provide effective stain removal and effective cleaning conditions (e.g. pH, quantity of foaming), amounts of certain components to effectively provide optical benefits (e.g. optical brightening, dye transfer inhibition), and amounts of certain components to effectively aid the processing (maintain physical characteristics during processing, storage and use; e.g. rheology modifiers, hydrotropes, desiccants).

In one embodiment, the detergent formulation according to the invention is a formulation of more than two detergent components, wherein at least one component is effective in stain-removal, at least one component is effective in providing the optimal cleaning conditions, and at least one component is effective in maintaining the physical characteristics of the detergent Individual detergent components and usage in detergent formulation are known to those skilled in the art. Suitable detergent components comprise inter alia surfactants, builders, polymers, alkaline, bleaching systems, fluorescent whitening agents, suds suppressors and stabilizers, hydrotropes, and corrosion inhibitors. Further examples are described e.g. in "complete Technology Book on Detergents with Formulations (Detergent Cake, Dishwashing Detergents, Liquid & Paste Detergents, Enzyme Detergents, Cleaning Powder & Spray Dried Washing Powder)", Engineers India Research Institute (EIRI), 6th edition (2015). Another reference book for those skilled in the art may be "Detergent Formulations Encyclopedia", Solverchem Publications, 2016.

Detergent components vary in type and/or amount in a detergent formulation depending on the desired application such as laundering white textiles, colored textiles, and wool. The component(s) chosen further depend on physical form of a detergent formulation (liquid, solid, gel, provided in pouches or as a tablet, etc.). The component(s) chosen e.g. for laundering formulations further depend on regional conventions which themselves are related to aspects like washing temperatures used, mechanics of laundry machine (vertical vs. horizontal axis machines), water consumption per wash cycle etc. and geographical characteristics like average hardness of water.

For example: A low detergent concentration system includes laundering formulations where less than about 800 ppm of detergent components are present in the wash water. A medium detergent concentration includes laundering formulations where between about 800 ppm and about 2,000 ppm of detergent components are present in the wash water. A high detergent concentration includes laundering formulations where more than about 2,000 ppm of detergent components are present in the wash water.

The numeric ranges recited for the individual detergent components provide amounts comprised in detergent formulations. Such ranges have to be understood to be inclusive of the numbers defining the range and include each integer within the defined range.

If not described otherwise, "% by weight" or "% w/w" is meant to be related to total detergent formulation. In this case "% by weight" or "% w/w" is calculated as follows: concentration of a substance as the weight of that substance divided by the total weight of the formulation, multiplied by 100.

In one embodiment, the detergent formulations according to the invention comprise one or more surfactant(s). "Surfactant" (synonymously used herein with "surface active agent") means an organic chemical that, when added to a liquid, changes the properties of that liquid at an interface. According to its ionic charge, a surfactant is called non-ionic, anionic, cationic, or amphoteric.

Non-limiting examples of surfactants are disclosed McCutcheon's 2016 Detergents and Emulsifiers, and McCutcheon's 2016 Functional Materials, both North American and International Edition, MC Publishing Co, 2016 edition. Further useful examples are disclosed in earlier editions of the same publications which are known to those skilled in the art.

In one embodiment, the detergent formulations according to the invention comprise a total amount of anionic surfactant which in the range of 1% to 30% by weight, in the range of 3% to 25% by weight, in the range of 5% to 20% by weight, or in the range of 8% to 15% by weight, all relative to the total weight of the detergent formulation. In one embodiment, the detergent formulation of the invention comprises a total amount of anionic surfactant of about 11% by weight relative to the total weight of the detergent formulation.

In one embodiment, the detergent formulations according to the invention comprise at least one anionic surfactant selected from compounds of general formula (I):

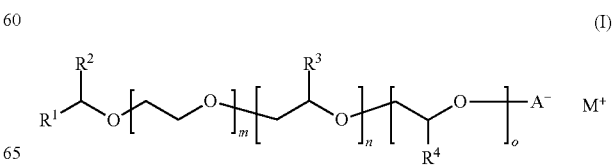

(I)

The variables in general formula (I) are defined as follows:

$R^1$ is selected from $C_1$-$C_{23}$-alkyl (such as 1-, 2-, 3-, 4-$C_1$-$C_{23}$-alkyl) and $C_2$-$C_{23}$-alkenyl, wherein alkyl and/or alkenyl are linear or branched, and wherein 2-, 3-, or 4-alkyl; examples are n-$C_7H_{15}$, n-$C_9H_{19}$, n-$C_{11}H_{23}$, n-$C_{13}H_{27}$, n-$C_{17}H_{35}$, i-$C_9H_{19}$, i-$C_{12}H_{25}$.

$R^2$ is selected from H, $C_1$-$C_{20}$-alkyl and $C_2$-$C_{20}$-alkenyl, wherein alkyl and/or alkenyl are linear or branched.

$R^3$ and $R^4$, each independently selected from $C_1$-$C_{16}$-alkyl, wherein alkyl is linear or branched; examples are methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, iso-hexyl, sec-hexyl, n-heptyl, n-octyl, 2-ethylhexyl, n-nonyl, n-decyl, isodecyl.

$A^-$ is selected from —$RCOO^-$, —$SO_3^-$ and $RSO_3^-$, wherein R is selected from linear or branched $C_1$-$C_8$-alkyl, and $C_1$-$C_4$ hydroxyalkyl, wherein alkyl is. Compounds might be called (fatty) alcohol/alkyl (ethoxy/ether) sulfates [(F)A(E)S] when $A^-$ is $SO_3^-$, (fatty) alcohol/alkyl (ethoxy/ether) carboxylate [(F)A(E)C] when $A^-$ is —$RCOO^-$.

$M^+$ is selected from H and salt forming cations. Salt forming cations may be monovalent or multivalent; hence $M^+$ equals $1/v\ M^{v+}$. Examples include but are not limited to sodium, potassium, magnesium, calcium, ammonium, and the ammonium salt of mono-, di, and triethanolamine.

The integers of the general formula (I) are defined as follows:

m is in the range of zero to 200, preferably 1-80, more preferably 3-20; n and o, each independently in the range of zero to 100; n preferably is in the range of 1 to 10, more preferably 1 to 6; o preferably is in the range of 1 to 50, more preferably 4 to 25. The sum of m, n and o is at least one, preferably the sum of m, n and o is in the range of 5 to 100, more preferably in the range of from 9 to 50.

Anionic surfactants of the general formula (I) may be of any structure, block copolymers or random copolymers.

Further suitable anionic surfactants include salts ($M^+$) of $C_{12}$-$C_{18}$ sulfo fatty acid alkyl esters (such as $C_{12}$-$C_{18}$ sulfo fatty acid methyl esters), $C_{10}$-$C_{18}$-alkylarylsulfonic acids (such as n-$C_{10}$-$C_{18}$-alkylbenzene sulfonic acids) and $C_{10}$-$C_{18}$ alkyl alkoxy carboxylates.

$M^+$ in all cases is selected from salt forming cations. Salt forming cations may be monovalent or multivalent; hence $M^+$ equals $1/v\ M^{v+}$. Examples include but are not limited to sodium, potassium, magnesium, calcium, ammonium, and the ammonium salt of mono-, di, and triethanolamine.

The detergent formulation may comprise at least two anionic surfactants, selected from compounds of general formula (I), wherein one of said anionic surfactants is characterized in $R^1$ being $C_{11}$, $R^2$ being H, m being 2, n and o=0, $A^-$ being $SO_3^-$, $M^+$ being $Na^+$ and the other surfactant is characterized in $R^1$ being $C_{13}$, $R^2$ being H, m being 2, n and o=0, $A^-$ being $SO_3^-$, $M^+$ being $Na^+$.

In one embodiment, the detergent formulations comprise at least one anionic surfactant selected from compounds of general formula (II):

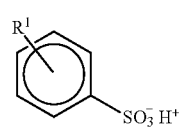

wherein $R^1$ in formula (II) is $C_{10}$-$C_{13}$ alkyl.

The detergent formulations may comprise at least two anionic surfactants, selected from compounds of general formula (II), wherein one of said anionic surfactants is characterized in $R^1$ being $C_{10}$, and the other surfactant is characterized in $R^1$ being $C_{13}$. Compounds like this may be called LAS (linear alkylbenzene sulfonates) herein.

The detergent formulations of the invention may comprise a total amount of non-ionic surfactants in the range of about 1% to about 15% by weight, in the range of about 3% to about 12% by weight, or in the range of about 4% to about 8% by weight, all relative to the total weight of the detergent formulation. In one embodiment, the detergent formulation of the invention comprises a total amount of non-ionic surfactants of about 5.5% by weight relative to the total weight of the detergent formulation.

In one embodiment, the detergent formulations according to the invention comprise at least one non-ionic surfactant according to general formula (III):

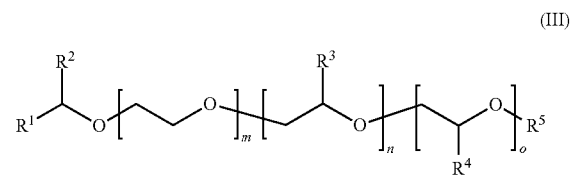

The variables of the general formula (III) are defined as follows:

$R^1$ is selected from $C_1$-$C_{23}$ alkyl and $C_2$-$C_{23}$ alkenyl, wherein alkyl and/or alkenyl are linear or branched; examples are n-$C_7H_{15}$, n-$C_9H_{19}$, n-$C_{13}H_{27}$, n-$C_{15}H_{31}$, n-$C_{17}H_{35}$, i-$C_9H_{19}$, i-$C_{12}H_{25}$.

$R^2$ is selected from H, $C_1$-$C_{20}$ alkyl and $C_2$-$C_{20}$ alkenyl, wherein alkyl and/or alkenyl are linear or branched.

$R^3$ and $R^4$, each independently selected from $C_1$-$C_{16}$ alkyl, wherein alkyl is linear or branched; examples are methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, iso-hexyl, sec-hexyl, n-heptyl, n-octyl, 2-ethylhexyl, n-nonyl, n-decyl, isodecyl.

$R^5$ is selected from H and $C_1$-$C_{18}$ alkyl, wherein alkyl is linear or branched.

The integers of the general formula (III) are defined as follows:

m is in the range of zero to 200, preferably 1-80, more preferably 3-20; n and o, each independently in the range of zero to 100; n preferably is in the range of 1 to 10, more preferably 1 to 6; o preferably is in the range of 1 to 50, more preferably 4 to 25. The sum of m, n and o is at least one, preferably the sum of m, n and o is in the range of 5 to 100, more preferably in the range of from 9 to 50.

The non-ionic surfactants of the general formula (III) may be of any structure, is it block or random structure, and is not limited to the displayed sequence of formula (III).

Compounds according to formula (III) may be called alkyl polyethyleneglycol ether (AEO) herein.

In one embodiment, the detergent formulations comprise at least one non-ionic surfactant selected from general formula (III), wherein m is in the range of 3 to 11, preferably not more than 7; n and o is 0, $R^1$ is $C_{12}$-$C_{14}$, $R^5$ is H. The detergent formulation may comprise at least two non-ionic surfactants, selected from compounds of general formula (III), wherein one of said non-ionic surfactants is characterized in $R^1$ being $C_{12}$, $R^5$ being H, m is 7, n and o=0, and the other surfactant is characterized in $R^1$ being $C_{14}$, $R^5$ being H, m being 7, n and o=0.

The detergent formulations according to the invention may comprise one or more compounds selected from complexing agents (chelating agents, sequestrating agents), precipitating agents, and ion exchange compounds which may form water-soluble complexes with calcium and magnesium. Such compounds may be called "builders" or "building agents" herein, without meaning to limit such compounds to this function in the final application of a detergent formulation. In one embodiment, the detergent formulation of the invention comprises at least one builder selected from non-phosphate based builders such as sodium gluconate, citrate(s), silicate(s), carbonate(s), phosphonate(s), amino carboxylate(s), polycarboxylate(s), polysulfonate(s), and polyphosphonate(s).

In one embodiment, the detergent formulations of the invention comprise at least one "citrate" selected from the mono- and the dialkali metal salts and in particular the mono- and preferably the trisodium salt of citric acid, ammonium or substituted ammonium salts of citric acid as well as citric acid as such. Citrate can be used as the anhydrous compound or as the hydrate, for example as sodium citrate dihydrate. The citrate may be comprised in a total amount in the range of 0% to about 20% by weight, in the range of about 0.5% to about 10% by weight, or in the range of 1-5% by weight, all relative to the total weight of the detergent formulation. In one embodiment, the detergent formulation of the invention comprises a total amount of citrate in the range of about 1-3% relative to the total weight of the detergent formulation.

The detergent formulations of the invention may comprise one or more hydrotropes. One or more hydrotropes may be selected from organic solvents such as ethanol, isopropanol, ethylene glycol, 1,2-propylene glycol, and further organic solvents known in the art that are water-miscible under normal conditions without limitation. In one embodiment, the detergent formulation of the invention comprises 1,2-propylene glycol in a total amount in the range of 5-10% by weight, preferably of about 6% by weight, all relative to the total weight of the detergent formulation.

In one embodiment, the detergent formulations of the invention does not comprise any further enzyme besides the mannanase according to the invention.

The detergent formulations may comprise one or more other enzyme(s) than a mannanase variant according to the invention, which are selected from the group consisting of proteases, amylases, cellulases, lipases, xylanases, mannanases different from the mannanase variants according to the invention, cutinases, esterases, phytases, DNAses, pectinases, pectate lyases, pectinolytic enzymes, carbohydrases, arabinases, galactanases, xanthanases, xyloglucanases, laccases, peroxidases and oxidases. Preferably, the detergent formulations comprise at least a protease as disclosed herein.

A protease may be comprised in the detergent formulations of the invention in amounts of about 0.004-0.4% by weight, 0.008-0.3% by weight, 0.04-0.25% by weight, all relative to the total weight of the detergent formulation and wherein the amount relates to 100% active content of the enzyme.

The detergent formulations may comprise water-soluble sources of calcium and/or magnesium ions. In one embodiment, at the detergent formulation comprises at least one enzyme stabilizer selected from polyols and water-soluble salts as disclosed above.

The detergent formulation may comprise at least one enzyme stabilizer selected from boron containing compounds and peptide stabilizers as disclosed above.

The mannanase variant according to the invention may preferably exert its mannan degrading activity at a temperature selected from 560° C., 540° C., and 525° C. Preferably, the temperature is washing or cleaning temperature. Mannan degrading activity in the context of washing or cleaning herein relates to its ability to remove mannan-containing stains.

In one embodiment, the detergent formulation of the invention is a laundering detergent.

The term "laundering" relates to both household laundering and industrial laundering and means the process of treating textiles with a solution comprising a detergent formulation of the present invention. The laundering process may be carried out by using technical devices such as a household or an industrial washing machine. Alternatively, the laundering process may be done by hand.

The term "textile" means any textile material including yarns (thread made of natural or synthetic fibers used for knitting or weaving), yarn intermediates, fibers, non-woven materials, natural materials, synthetic materials, as well as fabrics (a textile made by weaving, knitting or felting fibers) made of these materials such as garments (any article of clothing made of textile), cloths and other articles.

The term "fibers" includes natural fibers, synthetic fibers, and mixtures thereof. Examples of natural fibers are of plant (such as flax, jute and cotton) or animal origin, comprising proteins like collagen, keratin and fibroin (e.g. silk, sheep wool, angora, mohair, cashmere). Examples for fibers of synthetic origin are polyurethane fibers such as Spandex® or Lycra®, polyester fibers, polyolefins such as elastofin, or polyamide fibers such as nylon. Fibers may be single fibers or parts of textiles such as knitwear, wovens, or nonwovens.

The invention relates to a method to provide a liquid mannanase-comprising formulation, preferably a liquid detergent formulation, more preferably a liquid laundering detergent formulation, comprising the steps of mixing in one or more steps (a) at least one mannanase variant according to the invention, preferably wherein the mannanase is provided within an enzyme preparation of the invention and (b) at least one detergent component selected from surfactants, builders, and hydrotropes present in amounts effective in cleaning performance or effective in maintaining the physical characteristics of the detergent.

In one embodiment, the formulation has a pH in the range of 5-12 or 6-11, more preferably in a range selected from 6-10, 7-9, and 7.5-8.5. In one embodiment, the formulation is a detergent formulation, preferably a liquid detergent formulation, more preferably a liquid laundering detergent formulation.

The laundering detergent formulation of the invention exerts wash performance under relevant wash conditions. The term "relevant wash/cleaning conditions" herein refers to the conditions, particularly temperature, time, cleaning mechanics, suds concentration, type of detergent and water hardness, actually used in laundry machines, or in manual washing processes. In one embodiment, wash performance herein is related towards removal of mannan-comprising stains; preferably mannan-comprising stains are selected from those comprising galactomannans and glucomannans. In one embodiment, wash performance relates to removal of gains comprising locust bean gum and/or guar gum.

In one aspect, the present invention provides a method of removing mannan comprising stains by the steps of contacting at least one mannan comprising stain with a mannanase of the invention. The mannanase has mannan degrading activity at a pH in the range of 5-12 or 6-11, more preferably a pH in the range of 6-10 or 7-9 or 7-12 or 8-12 or 8-10, and most preferably at a pH in the range of 7.5-8.5. At said pH the mannanase shows wash performance on mannan comprising stains. Preferably, the method is a method of removing mannan comprising stains at temperatures ≤60° C., preferably in the range of about 5-60° C., preferably in the range of about 5-40° C., more preferably in the range of about 10-40° C.

In one aspect, the invention relates to a method of removing mannan comprising stains at temperatures ≤60° C., preferably in the range of about 5-60° C., preferably in the range of about 5-40° C., more preferably in the range of about 10-40° C., by the steps of
(a) providing a liquid formulation comprising at least one mannanase according to the invention,
(b) contacting a mannan-comprising stain with the liquid formulation of (a)
(c) let the enzyme exert its catalytic activity on the stain for a time in the range of about 10-90 minutes, preferably 20-80 minutes, more preferably 30-70 minutes, or even more preferably 40-60 minutes.

In one embodiment, the method of removing mannan comprising stains is characterized in being a method of washing which is preferably done under mechanical agitation in a laundry machine. The liquid formulation preferably is a liquid detergent formulation.

The invention relates to the use of at least one mannanase variant according to the invention, to increase washing or cleaning performance of a detergent formulation towards mannan-comprising stains, preferably stains comprising locust bean gum and/or guar gum.

In one embodiment, the detergent formulation has a pH in the range of 5-12 or 6-11, more preferably in a range selected from 6-10, 7-9, and 7.5-8.5. In one embodiment, the formulation is a liquid detergent formulation, preferably a liquid laundering detergent formulation.

In one embodiment, the washing or cleaning performance is increased at washing or cleaning temperatures ≤60° C., preferably in the range of about 5-60° C., preferably in the range of about 5-40° C., more preferably in the range of about 10-40° C.

In one aspect, the invention relates to a method of washing or cleaning, comprising the steps of
(a) providing at least one mannan-comprising stain;
(b) providing a detergent formulation according to the invention
(c) contacting the mannan-comprising stain with the detergent of (b).

In one embodiment, the mannan-comprising stain in step (a) is provided on a textile.

In one embodiment, the mannanase comprised in the detergent according to the invention removes the mannan-comprising stains from the textile (a) by (c) contacting the mannan-comprising stain with a detergent of (b), preferably under mechanical agitation in a washing machine.

EXAMPLES

Example 1: Expression and Purification of Mannanase Variants

The genes were synthesized and cloned into Bacillus expression vector by GenScript (New Jersey, USA). The constructs were received from GenScript as sequence-confirmed plasmid DNA and transformed into Bacillus subtilis. 5 μL of plasmid DNA, 20-200 ng/μL was added to 500 μL freshly prepared Bacillus subtilis competent cells and incubated at 37° C. for 3.5 hours. Cells were subsequently plated onto LB+50 ug/mL Kanamycin agar plates and grown overnight at 37° C. To confirm the mannanase expression in Bacillus subtilis, the resulting colonies were screened via colony PCR and sequencing. Prior to PCR, each colony was lysed in buffer containing 20 mM DTT and 0.5 mg/mL Proteinase K at 55° C. for 5 minutes followed by 95° C. for 6 minutes. 20 μL PCR reactions using 1 μL of lysed cells and TaKaRa Ex Taq (TaKaRa Cat #RR001) polymerase were performed as follows: initial denaturation for 3 minutes at 98° C., 30 cycles of denaturation, annealing, and extension for 10 seconds at 95° C., 30 seconds at 55° C., and 2.5 minutes at 72° C., respectively. A final extension for 5 minutes at 72° C. completed the PCR reactions. Expression of the mannanase was done for example in microtiter plate format. Fermentations were carried out at 30° C. and under 1000 rpm of agitation for approximately 48 hours. The final fermentation broth was centrifuged at 2500×g for 15 mins at 4° C. to obtain the cell-free supernatant. Protein quantification was estimated using an automated capillary gel electrophoresis device; LabChip® GX II with an HT Protein-Express LabChip® and an HT Protein Express Reagent Kit (PerkinElmer, USA). Determination of protein purity and quantitation was carried out using the Regular Sensitivity HT Protein Express 200 assay and analysis performed using the LabChip® GX Reviewer 5.3 software. Molecular weight determinations were performed either via the LabChip software, which uses bracketing ladders of protein standards (as part of the HT Protein Express Reagent Kit) to assign MW of the peaks and quantitation, or by using known protein standards and the "Titer" function within the instrument analysis software, or by using the LabChip derived peak area of a set of protein standards with known concentrations, to generate a standard curve and resulting quantitation for protein of interest.

Example 2: Expression of Mannanases Expression

Expression of the mannanase was completed in 384-well deep well plate. Fermentations were carried out at 37° C. and under 1000 rpm of agitation for approximately 48 hours. The final fermentation broth was centrifuged at 2500×g for 15 mins at 4° C. to obtain the cell-free supernatant.

Protein quantification was estimated using an automated capillary gel electrophoresis device; LabChip® GX II with an HT ProteinExpress LabChip® and an HT Protein Express Reagent Kit (PerkinElmer, USA). Determination of protein purity and quantitation was carried out using the Regular Sensitivity HT Protein Express 200 assay and analysis performed using the LabChip® GX Reviewer 5.3 software. Molecular weight determinations were performed either via the LabChip software, which uses bracketing ladders of protein standards (as part of the HT Protein Express Reagent Kit) to assign MW of the peaks and quantitation, or by using known protein standards and the "Titer" function within the instrument analysis software, or by using the LabChip derived peak area of a set of protein standards with known concentrations, to generate a standard curve and resulting quantitation for protein of interest.

Degradation stability of mannanase variants was determined by calculating the quantity of full length enzyme as well as the percent of full length mannanase (quantity of full length divided by the summed total of the full length mannanase and observed degradation product(s) multiplied by 100).

TABLE Ex2 degradation-stability during fermentation of mannanase variants with single point amino acid substitutions as indicated in the table when compared to the parent enzyme

| parent | substitution | Quantity of full length | % of full length |
|---|---|---|---|
| parent | — | 1 | 1 |
| N341 | F | 1.67 | 3.62 |
| F346 | T | 1.97 | 3.32 |
| T348 | S | 1.52 | 2.57 |
| T348 | R | 1.55 | 2.65 |
|  | N | 2.31 | 7.17 |
|  | M | 1.57 | 3.17 |
|  | G | 2.78 | 6.39 |
| E349 | T | 1.63 | 2.25 |
|  | S | 1.92 | 3.89 |
|  | G | 2.52 | 5.24 |
| E349 | D | 1.79 | 3.78 |
| S352 | N | 1.49 | 2.09 |
|  | G | 2.76 | 5.76 |
| G356 | Y | 1.59 | 2.79 |
| G356 | V | 1.46 | 1.65 |
|  | T | 1.66 | 2.89 |
|  | Q | 1.41 | 1.51 |
|  | H | 1.80 | 2.23 |
|  | C | 1.52 | 2.72 |
| D379 | V | 3.65 | 6.12 |

Example 3: Mannanase Activity after Storage

Shelf life stability was determined in ES1 formulation adjusted to pH 8 for 6 days at 37° C.
ES1 Detergent Formulation:

| component | type | A Conc [%] |
|---|---|---|
| Lutensit A-LBS[1] | LAS | 5.5 |
| Edenor coco fatty acid | $C_{12}$-$C_{18}$ coco fatty acid | 2.4 |
| Lutensol AO7[2] | AEO | 5.5 |
| Texapon N70[3] | FAEO | 5.5 |
|  | 1,2 propylene glycol | 6.0 |
|  | ethanol | 2.0 |
|  | KOH | 2.2 |
| Enzyme |  | As per example |
| Water |  | Fill to 100% |

[1]two anionic surfactants, selected from compounds according to general formula (II), wherein one of said anionic surfactants is characterized in $R^1$ being $C_{10}$, and the other surfactant is characterized in $R^1$ being $C_{13}$.
[2]compound of general formula (III), wherein one of said non-ionic surfactants is characterized in $R^1$ being n-$C_{12}H_{25}$, $R^2$ and $R^3$ being H, m being 3-30, preferably 7, n and o = 0, and the other surfactant is characterized in $R^1$ being n-$C_{14}H_{29}$, $R^2$ and $R^3$ being H, m being 3-30, preferably 7, n and o = 0.
[3]two anionic surfactants selected from compounds of general formula (I), and wherein one of said anionic surfactants is characterized in $R^1$ being $C_{11}$, $R^2$ being H, m being 2, n and o = 0, $A^-$ being $SO_3^-$, $M^+$ being $Na^+$, and the other surfactant is characterized in $R^1$ being $C_{13}$, $R^2$ being H, m being 2, n and o = 0, $A^-$ being $SO_3^-$, $M^+$ being $Na^+$.

900 µl of buffer/detergent formulation were supplemented with 15.2 mg/mL mannanase enzyme. The probes were stored at 37° C. for several days. 50 µl of a sample were taken from the original probe at a certain point in time and diluted in 800 µl HEPES buffer. The sample was incubated for 5 min at 37° C. 200 µl of this sample were mixed with 200 µl of substrate (1% Azo Carob Galactomannan) and further incubated for 60 min. 200 µl of the reaction mix were then added to 350 µl 95% ethanol on ice and incubated for 10 min. Afterwards, the reaction mix was centrifuged at 4000×g for 10 min. The absorption of 250 µl of the resulting supernatant was determined at 590 nm. Mannanase activity measured after storage at points in time as indicated in the tables below are provided in improvement factors relative to the parent enzyme which is set 1.0.

TABLE Ex3 mannanase variants with single point amino acid substitutions as indicated in the table having improved stability in formulation containing surfactants when compared to the parent enzyme

| parent | substitution | Improvement factor |
|---|---|---|
| parent | --- | 1 |
| D86 | N | 1.60 |
| Q89 | V | 2.11 |
|  | L | 1.43 |
| N96 | D | 2.61 |
| L101 | V | 2.37 |
|  | T | 1.23 |
| S103 | Y | 1.60 |
|  | E | 1.31 |
|  | A | 1.07 |
| K107 | N | 1.11 |
| N108 | G | 1.37 |
| N109 | Q | 1.32 |
|  | A | 1.06 |
| A112 | N | 2.41 |
| A119 | Y | 2.42 |
|  | H | 1.74 |
|  | T | 1.57 |
| N122 | S | 1.43 |
| A124 | D | 2.43 |
|  | E | 1.52 |
|  | C | 1.13 |
| S126 | E | 1.64 |
| S127 | A | 2.42 |
| N129 | M | 2.87 |
|  | L | 2.48 |
|  | F | 1.99 |
| S231 | Q | 1.57 |
|  | K | 1.47 |
|  | L | 1.42 |
| S231 | P | 1.35 |
|  | Y | 1.26 |
| I233 | V | 1.37 |
| S235 | Y | 1.90 |
|  | H | 1.78 |
|  | R | 1.64 |
|  | L | 1.32 |
|  | Q | 1.22 |
|  | N | 1.09 |
| D244 | N | 1.76 |
|  | I | 1.08 |
|  | V | 1.04 |
| H254 | W | 2.17 |
| K255 | Y | 1.33 |
|  | H | 1.13 |
|  | R | 1.05 |
| E264 | Q | 1.42 |
|  | V | 1.36 |
| S270 | T | 1.18 |
| Q272 | I | 1.09 |
| K273 | T | 1.30 |
| N274 | Q | 1.14 |
|  | E | 1.07 |
|  | C | 1.06 |
| S281 | L | 3.74 |
| G286 | E | 3.09 |
|  | L | 3.04 |
|  | Q | 2.60 |
|  | A | 2.39 |
| W289 | F | 2.89 |
|  | M | 2.51 |
|  | H | 2.39 |
| S290 | A | 1.47 |
| N296 | H | 1.73 |
|  | Y | 1.42 |
|  | F | 1.29 |
| D301 | T | 1.70 |
|  | E | 1.60 |

TABLE Ex3-continued mannanase variants with single point amino acid substitutions
as indicated in the table having improved stability in formulation
containing surfactants when compared to the parent enzyme

| parent | substitution | Improvement factor |
|---|---|---|
| D301 | C | 1.57 |
| T309 | L | 1.44 |
| N312 | Y | 1.99 |
|  | F | 1.73 |
| A314 | P | 1.12 |
|  | S | 1.11 |
| L317 | T | 1.23 |
| A319 | E | 1.99 |
|  | D | 1.33 |
| D328 | I | 1.79 |
|  | Q | 1.30 |
|  | V | 1.25 |
| G329 | T | 1.58 |
|  | L | 1.26 |
|  | S | 1.23 |
|  | V | 1.12 |
| G330 | P | 1.38 |
|  | D | 1.28 |
|  | T | 1.27 |
| D331 | A | 1.21 |
|  | Q | 1.19 |
| Y344 | Q | 1.36 |
|  | F | 1.33 |
|  | T | 1.10 |
| M359 | R | 1.39 |
|  | Y | 1.34 |
|  | C | 1.25 |
|  | Q | 1.14 |
| Y374 | G | 1.68 |
|  | V | 1.39 |
|  | A | 1.37 |
|  | R | 1.28 |
|  | N | 1.23 |
|  | P | 1.09 |
| L416 | W | 1.21 |
| W432 | P | 2.19 |
|  | N | 1.74 |
|  | L | 1.45 |
| W432 | R | 1.40 |
|  | S | 1.32 |
|  | T | 1.29 |
| W432 | G | 1.21 |
|  | H | 1.21 |
|  | I | 1.15 |

Example 4: Shelf-Life Stability in Detergents

Shelf life stability was determined in
(a) commercially available non-enzyme comprising detergent Persil non-bio
(b) commercially available Tide heat treated to inactivate enzymes
(c) ES1 formulation as described above
for 1 or 4 days at 42° C., or 15 days at 37° C.

Further the detergents were supplemented with 0.2% by weight protease with an amino acid sequence according to SEQ ID NO:22 having a substitution R101E where indicated in the tables below.

900 µl of buffer/detergent formulation were supplemented with 15.2 mg/mL mannanase enzyme. The probes were stored at 37° C. for several days. 50 µl of a sample were taken from the original probe at a certain point in time and diluted in 800 µl HEPES buffer. The sample was incubated for 5 min at 37° C. 200 µl of this sample were mixed with 200 µl of substrate (1% Azo Carob Galactomannan) and further incubated for 60 min. 200 µl of the reaction mix were then added to 350 µl 95% ethanol on ice and incubated for 10 min. Afterwards, the reaction mix was centrifuged at 4000×g for 10 min. The absorption of 250 µl of the resulting supernatant was determined at 590 nm. Mannanase activity measured after storage at points in time as indicated in the tables below are provided in improvement factors relative to the parent enzyme which is set 1.0.

TABLE Ex4a shelf-life stability; mannanase activity after storage
for 1 day at 42° C.; the numbers provided in the
table are normalized to the parent enzyme not containing
a mutation (improvement factor relative to the parent)

| Mannanase | Improvement factor |
|---|---|
| no mutation | 1.00 |
| N96D---A119H---G286E---N312Y | 4.19 |
| Q89V---N96D---W289M | 3.99 |
| Q89V---N96D---A112N---S127A---W289M | 2.75 |
| Q89V---A119H---N312Y---D379V | 2.65 |
| A119H---S127A---W289M---N312Y | 2.63 |
| Q89V---A112N---A119H---S127A | 2.58 |
| N96D---A112N---A119H---D379V | 2.54 |
| N96D---A112N---A119H---N312Y | 2.52 |
| N96D---A112N---A119H---S127A---N129M---G286E | 2.50 |
| A112N---A119H---W289M---D379V | 2.50 |
| Q89V---N96D---S127A---W289M---N312Y | 2.45 |
| N96D---N312Y | 2.34 |
| Q89V---N96D---A112N---A119H---S127A---N312Y | 2.34 |
| N96D---W289M | 2.30 |
| A112N---A119H---N312Y---D379V | 2.23 |
| Q89V---N96D---A112N---A119H---W289M---N312Y | 2.17 |
| A119H---G286E---W289M---D379V | 2.12 |
| Q89V---A112N---N129M | 2.12 |
| Q89V---N96D---N312Y | 2.10 |
| A112N---N129M---G286E---W289M---N312Y | 2.07 |
| N129---N312Y | 2.07 |
| Q89V---N96D---G286E---W289M---N312Y | 2.06 |
| Q89V---N96D---S127A---N312Y | 2.04 |
| Q89V---N312Y---D379V | 2.04 |
| S127A---N129M---N312Y---D379V---S444P | 2.02 |
| Q89V---A119H---N312Y---D379V | 2.01 |
| Q89V---N96D-A119H---N129M---G286E---W289M---N312Y | 2.01 |
| A112N---A119H---S127A---N129M---W289M | 2.01 |
| N96D---W289M | 2.00 |
| N96D---W289M---D379V | 1.99 |
| Q89V---N96D---A119H---S127A---N129M---N312Y | 1.97 |
| Q89V---N312Y | 1.95 |
| Q89V---A119H---G286E---N312Y | 1.95 |
| Q89V---N96D---N129M---D379V | 1.94 |
| N96D---N312Y | 1.93 |
| N96D---A112N---A119H---S127A---G286E---D379V | 1.91 |
| A119H---W289M | 1.89 |
| Q89V---N96D---A112N---A119H---N312Y | 1.87 |
| Q89V---N129M | 1.87 |
| N96D---A119H---G286E---W289M---N312Y | 1.87 |
| Q89V---A112N---N129M---G286E---N312Y---D379V | 1.87 |
| Q89V---N96D---A119H---N312Y---D379V | 1.86 |
| S127A---N129M | 1.85 |
| Q89V---N312Y---D379V | 1.84 |
| N96D---A112N---A119H---N312Y | 1.83 |
| Q89V---A119H---G286E---W289M---N312Y | 1.82 |
| W289M---S445P | 1.81 |
| N96D---A112N---A119H---S127A---N312Y | 1.80 |
| N96D---A112N---A119H | 1.79 |
| Q89V---A112N---N129M---N312Y | 1.78 |
| Q89V---N96D---S127A---N129M---N312Y | 1.76 |
| A119H---N312Y | 1.73 |
| G286E | 1.72 |
| Q89V---N96D---A112N---S127A---G286E---W289M---N312Y | 1.67 |
| A112N---A119H---S127A---N312Y | 1.64 |
| N96D---A119H---N312Y | 1.63 |
| N96D---A119H---D379V | 1.59 |
| N96D---N312Y | 1.58 |
| N96D---A119H---S127A---N312Y | 1.53 |
| Q89V---N96D---N312Y | 1.51 |

TABLE Ex4a-continued shelf-life stability; mannanase activity after storage for 1 day at 42° C.; the numbers provided in the table are normalized to the parent enzyme not containing a mutation (improvement factor relative to the parent)

| Mannanase | Improvement factor |
|---|---|
| N96D---A119H---S127A | 1.48 |
| N96D---A112N---A119H | 1.44 |
| Q89V | 1.34 |
| Q89V---A119H | 1.33 |
| N96D---N312Y | 1.33 |
| N312Y | 1.31 |
| Q89V---A112N | 1.24 |
| Q89V---A119H---N129M | 1.24 |
| N96D---A112N | 1.21 |
| D379V | 1.02 |

TABLE Ex4b shelf-life stability; mannanase activity after 15 days of storage at 37° C.; the numbers provided in the table are normalized to the parent enzyme not containing a mutation (improvement factor relative to the parent)

| Mannanase | Improvement factor | | |
|---|---|---|---|
| | ES1 | PersilNB | HT Tide |
| Parent, no mutation | 1.00 | 1.00 | 1.00 |
| A31V-Q89V-N96D-A119H-W289M-N312Y-T348N-S352G | 2.23 | 1.20 | 1.57 |
| Q89V-N96D-A119H-E246Q-W289M-N312Y-T348N | 2.46 | 1.16 | 1.49 |
| Q89V-N96D-A119H-E264Q-W289M-N312Y-T348N-E349G | 2.33 | 1.15 | 1.75 |
| Q89V-N96D-A119H-E264Q-W289M-N312Y-T348N-E349G-S352G | 2.14 | 1.10 | 1.33 |
| Q89V-N96D-A119H-E264Q-W289M-N312Y-T348N-S352G | 2.08 | 1.22 | 1.36 |
| Q89V-N96D-A119H-E264Q-W289M-N312Y-E349G-S352G | 1.98 | 1.11 | 1.73 |
| Q89V-N96D-A119H-E264Q-W289M-N312Y-S352G | 2.05 | 1.20 | 1.51 |
| Q89V-N96D-A119H-W289M-N312Y | 1.62 | 1.03 | 1.32 |
| Q89V-N96D-A119H-W289M-N312Y-T348N | 1.80 | 1.20 | 1.61 |
| Q89V-N96D-A119H-W289M-N312Y-T348N-E349G | 2.14 | 1.20 | 1.42 |
| Q89V-N96D-A119H-W289M-N312Y-T348N-E349G-S352G | 2.29 | 1.21 | 1.56 |
| Q89V-N96D-A119H-W289M-N312Y-E349G | 1.67 | 1.12 | 1.28 |
| Q89V-N96D-A119H-W289M-N312Y-E349G-S352G | 2.19 | 1.18 | 1.57 |
| Q89V-N96D-A119H-W289M-N312Y-S352G | 1.75 | 1.13 | 1.68 |

TABLE Ex4c in-detergent stability in detergents comprising protease with an amino acid sequence according to SEQ ID NO: 22 having a substitution R101E - accelerated shelf-life for 4 days, 42° C.

| Mannanase | Improvement factor | | |
|---|---|---|---|
| | PersilNB | HT Tide | ES1 |
| Parent, no mutation | 1 | 1 | 1 |
| Q89V---N96D---A112N---S127A---W289M | 1.17 | 2.71 | 1.84 |
| Q89V---N96D---A119H---G286E---N312Y | 1.05 | 2.01 | 3.54 |
| Q89V---N96D---A119H---G286E---W289M | 1.05 | 1.52 | 3.29 |
| Q89V---N96D---A119H---G286E---W289M---N312Y | 1.16 | 1.43 | 3.48 |
| Q89V---N96D---A119H---G286E---W289M---N312Y---D379V | 1.08 | 1.37 | 2.65 |
| Q89V---N96D---A119H---K145E---W289M---D379V | 1.17 | 1.67 | 2.67 |
| Q89V---N96D---A119H---N129M---G286E | 0.99 | 1.09 | 3.60 |
| Q89V---N96D---A119H---N129M---G286E---N312Y---D379V | 1.09 | 0.89 | 3.29 |
| Q89V---N96D---A119H---N129M---G286E---W289M---N312Y | 1.22 | 1.33 | 2.03 |
| Q89V---N96D---A119H---N129M---W289M | 0.93 | 1.46 | 2.82 |
| Q89V---N96D---A119H---N312Y | 0.98 | 1.15 | 2.29 |
| Q89V---N96D---A119H---N312Y---D379V | 1.02 | 1.30 | 2.10 |
| Q89V---N96D---A119H---W289M---N312Y | 1.26 | 1.70 | 3.62 |
| Q89V---N96D---A119H---W289M---N312Y---D379V | 1.15 | 1.01 | 3.08 |
| Q89V---N96D---S127A---N129M---W289M---N312Y | 1.10 | 2.03 | 2.90 |
| Q89V---N96D---S127A---N129M---N312Y | 0.95 | 1.78 | 3.14 |
| Q89V---N96D---S127A---N129M---N312Y---D379V | 1.07 | 1.09 | 2.30 |
| Q89V---N96D---S127A---G286E---N312Y---D379V | 1.10 | 0.77 | 4.30 |
| Q89V---N96D---S127A---G286E---W289M---N312Y---D379V | 1.20 | 1.18 | 2.89 |
| Q89V---N96D---S127A---W289M---N312Y | 1.21 | 1.49 | 2.82 |
| Q89V---N96D---N129M---G286E---W289M | 1.26 | 2.01 | 1.86 |
| Q89V---N96D---N129M---G286E---N312Y | 1.17 | 1.11 | 3.58 |
| Q89V---N96D---N129M---N312Y---D379V | 0.97 | 1.81 | 3.66 |

TABLE Ex4c-continued in-detergent stability in detergents comprising protease with an amino acid sequence according to SEQ ID NO: 22 having a substitution R101E - accelerated shelf-life for 4 days, 42° C.

| Mannanase | Improvement factor | | |
|---|---|---|---|
|  | PersilNB | HT Tide | ES1 |
| Q89V---N96D---G286E---N312Y | 1.25 | 1.19 | 4.44 |
| Q89V---N96D---G286E---W289M | 1.16 | 0.99 | 3.59 |
| Q89V---N96D---G286E---W289M---D379V | 1.08 | 0.85 | 3.28 |
| Q89V---N96D---G286E---W289M---N312Y | 1.06 | 1.09 | 4.04 |
| Q89V---N96D---G286E---W289M---N312Y | 0.96 | 1.34 | 3.18 |
| Q89V---N96D---G286E---W289M---N312Y---D379V | 1.15 | 1.19 | 2.76 |
| Q89V---N96D---W289M---N312Y---D379V | 1.25 | 1.28 | 3.22 |
| Q89V---N96D---N312Y---D379V | 0.93 | 0.85 | 2.74 |
| Q89V---A119H---W289M | 1.17 | 1.04 | 1.76 |
| Q89V---A119H---N312Y---D379V | 1.08 | 1.90 | 2.14 |
| Q89V---W289M---N312Y | 1.16 | 1.16 | 1.92 |
| N96D---A112N---A119H---S127A---N129M---G286E | 1.09 | 1.27 | 2.67 |
| N96D---A119H | 0.98 | 1.12 | 2.44 |
| N96D---A119H---S127A---N129M---G286E---N312Y---D379V | 1.20 | 0.95 | 3.65 |
| N96D---A119H---S127A---W289M---N312Y | 1.10 | 1.12 | 3.20 |
| N96D---A119H---N129M---G286E---W289M---N312Y---D379V | 1.15 | 1.50 | 2.34 |
| N96D---A119H---G286E---W289M | 1.12 | 1.57 | 2.93 |
| N96D---A119H---G286E---W289M---N312Y | 1.19 | 1.17 | 2.91 |
| N96D---A119H---G286E---W289M---N312Y---D379V | 1.05 | 1.24 | 2.39 |
| N96D---A119H---G286E---N312Y | 1.10 | 0.98 | 3.52 |
| N96D---A119H---G286E---N312Y---D379V | 1.03 | 1.92 | 3.23 |
| N96D---A119H---W289M | 1.15 | 1.11 | 3.01 |
| N96D---A119H---W289M---N312Y | 1.07 | 1.39 | 3.35 |
| N96D---A119H---W289M---N312Y---D379V | 1.15 | 1.42 | 3.22 |
| N96D---A119H---W289M---D379V | 1.17 | 1.33 | 2.83 |
| N96D---S127A---N129M---G286E---N312Y | 1.16 | 1.46 | 4.15 |
| N96D---S127A---N129M---G286E---W289M---N312Y | 1.18 | 1.96 | 2.90 |
| N96D---S127A---G286E---W289M---N312Y---D379V | 1.16 | 2.29 | 3.89 |
| N96D---S127A---N312Y | 1.01 | 2.17 | 3.99 |
| N96D---N129M---G286E---W289M---N312Y | 1.10 | 1.17 | 2.79 |
| N96D---G286E---W289M---N312Y---D379V | 1.13 | 1.34 | 3.91 |
| A119H---S127A---N129M---N312Y | 1.11 | 1.09 | 1.31 |
| A119H---N129M---W289M---N312Y | 1.24 | 3.32 | 2.02 |
| A119H---N312Y | 1.19 | 1.00 | 1.36 |
| S127A---N129M---N312Y---D379V---S444P | 1.05 | 1.47 | 1.48 |
| S127A---G286E---W289M---N312Y | 1.04 | 1.07 | 2.38 |

The invention claimed is:

1. A mannanase variant comprising an amino acid sequence having at least 90% sequence identity to the full-length amino acid sequence of SEQ ID NO: 2, SEQ ID NO: 3, or SEQ ID NO: 4, wherein the mannanase variant comprises two or more amino acid substitutions selected from the group consisting of A31V, Q89V, N96D, A119Y/H/T, E264Q/V, W289F/M/H, N312F/Y, T348S/R/N/M/G, E349T/S/D/G, S352N/G, and D379V, wherein the numbering is according to SEQ ID NO: 2, and wherein the mannanase variant has mannan-degrading activity.

2. The mannanase variant according to claim 1, wherein the mannanase variant comprises the amino acid substitutions Q89V and N96D and one or more amino acid substitutions selected from the group consisting of A31V, A119Y/H/T, E264Q/V, W289F/M/H, and N312F/Y.

3. A polynucleotide comprising a nucleotide sequence encoding the mannanase variant according to claim 1.

4. An expression construct comprising the polynucleotide according to claim 3.

5. A host cell comprising the polynucleotide according to claim 3.

6. A method of expressing the mannanase variant according to claim 1, comprising the steps of
   (a) providing a host cell comprising a polynucleotide with a nucleotide sequence encoding the mannanase variant of claim 1;
   (b) cultivating the host cell of step (a) under conditions conducive for the expression of the mannanase variant; and
   (c) optionally, recovering the mannanase variant.

7. A liquid enzyme preparation comprising the mannanase variant according to claim 1, at least one compound stabilizing the liquid enzyme preparation, at least one solvent, and optionally at least one enzyme stabilizer.

8. A liquid formulation comprising the mannanase variant according to claim 1, wherein the formulation has a pH in the range of 5-12.

9. A method to provide a detergent formulation, comprising the steps of mixing in one or more steps
   (a) at least one mannanase variant according to claim 1, optionally wherein the mannanase variant is provided within an enzyme preparation, and
   (b) at least one component selected from surfactants, builders, and hydrotropes.

10. A method of washing or cleaning, comprising the steps of
    (a) providing at least one mannan-comprising stain;
    (b) providing the liquid formulation according to claim 8; and
    (c) contacting the mannan-comprising stain of (a) with the liquid formulation of (b).

11. The method according to claim 10, wherein the mannan-comprising stain is provided on a textile; and wherein the liquid formulation removes the mannan-comprising stain from the textile.

12. The method of claim 10, wherein, in step (c), the mannan-comprising stain is contacted with the liquid formulation at temperatures in the range of 5-60° C.

13. The method of claim 10, wherein the at least one mannan-comprising stain comprises locust-bean and/or guar gum.

14. The polynucleotide of claim 3, wherein the nucleotide sequence of the polynucleotide has at least 90% sequence identity to the nucleotide sequence of SEQ ID NO: 1.

15. The mannanase variant of claim 1, wherein the mannanase variant comprises an amino acid sequence having at least 90% sequence identity to the full-length amino acid sequence of SEQ ID NO: 2 or SEQ ID NO: 3, wherein the mannanase variant comprises two or more amino acid substitutions selected from the group consisting of A31V, Q89V, N96D, A119Y/H/T, E264Q/V, W289F/M/H, N312F/Y, T348S/R/N/M/G, E349T/S/D/G, S352N/G, and D379V, wherein the numbering is according to SEQ ID NO: 2, and wherein the mannanase variant has mannan-degrading activity.

16. The mannanase variant of claim 1, wherein the mannanase variant comprises an amino acid sequence having at least 95% sequence identity to the full-length amino acid sequence of SEQ ID NO: 2 or SEQ ID NO: 3, wherein the mannanase variant comprises two or more amino acid substitutions selected from the group consisting of A31V, Q89V, N96D, A119Y/H/T, E264Q/V, W289F/M/H, N312F/Y, T348S/R/N/M/G, E349T/S/D/G, S352N/G, and D379V, wherein the numbering is according to SEQ ID NO: 2, and wherein the mannanase variant has mannan-degrading activity.

17. The mannanase variant of claim 1, wherein the mannanase variant comprises an amino acid sequence having at least 90% sequence identity to the full-length amino acid sequence of SEQ ID NO: 4, wherein the mannanase variant comprises two or more amino acid substitutions selected from the group consisting of A31V, Q89V, N96D, A119Y/H/T, E264Q/V, W289F/M/H, N312F/Y, T348S/R/N/M/G, E349T/S/D/G, S352N/G, and D379V, wherein the numbering is according to SEQ ID NO: 2, and wherein the mannanase variant has mannan-degrading activity.

18. The liquid enzyme preparation of claim 7, wherein the at least one compound stabilizing the liquid enzyme preparation is a preservative, and the at least one solvent is glycerol.

19. The mannanase variant of claim 1, wherein the mannanase variant comprises an amino acid sequence having at least 95% sequence identity to the full-length amino acid sequence of SEQ ID NO: 4, wherein the mannanase variant comprises two or more amino acid substitutions selected from the group consisting of A31V, Q89V, N96D, A119Y/H/T, E264Q/V, W289F/M/H, N312F/Y, T348S/R/N/M/G, E349T/S/D/G, S352N/G, and D379V, wherein the numbering is according to SEQ ID NO: 2, and wherein the mannanase variant has mannan-degrading activity.

* * * * *

SEQUENCE LISTING

<160> NUMBER OF SEQ ID NOS: 4

<210> SEQ ID NO 1
<211> LENGTH: 1473
<212> TYPE: DNA
<213> ORGANISM: Unknown
<220> FEATURE:
<223> OTHER INFORMATION: Sequence was obtained from environmental
      sample.

<400> SEQUENCE: 1
atgtcaatta ttaagaaagt tccattaata tttctatgtc tcctaatgtt tgctacttct    60
ctatttattt ttaagcctga ggtaaaagca gcaactggct tttatgtaaa cggaaacact    120
ctgtacgatg caacaggtag cccgtttgtt atgaggggaa ttaaccatgc tcattcttgg    180
tttaaagatg attcttctac agcaatccct gctatagcga agacaggggc taatactatt    240
agaatcgtcc tatctgatgg aagccagtat acaaaagatg atattaatac agtaaaaagt    300
cttatatcct tagctgagaa gaataacctt attgctattt tagaggtgca tgatgccaca    360
ggaaacgatg ctgttagctc gttaaacgat gctgttagct attggattag tattaaagag    420
gctcttattg gaaaagaaga tagggtctta attaatattg ccaatgaatg gtatggtact    480
tgggatggtg caagttgggc aagtggctat aaacaggcta ttccaaagtt aagagatgct    540

```
ggactcagcc atacattaat tgtagattcc gcaggttggg gacaatatcc agagtctatc    600
catcaatatg gtaaagatgt atttaatgct gatccactaa aaaatacaat gttttctatt    660
catatgtatg aatatgctgg gggggatgct tccactatta aatcaaatat tgacggagta    720
ctgaatcagg atcttgcatt aattattggt gaatttggac ataaacatac gaatggagat    780
gttgatgagg aaacaattat gagttactca cagcagaaga atgttggttg ttagcttgg    840 tcttggaaag gtaatggccc cgagtggagt tatttagact tatcaaatga ttgggctgga    900
gataatttaa cctcgtgggg taatacaatt gtaaatggag ctaatggttt aaaagctact    960
tctaaaataa gtccagtatt tgatggagga gatcatcctg gtggttcagg tggaactgaa   1020
aatactttgt ataatttcga aaccgaaaca caaagctgga gtggtggaaa tgtaatggct   1080
ggaccctggt caacgaatga gtgggcatca aaagacaact attctttaaa agctgatgtt   1140
caattaaaca ataattccca gcattattta tctttaactc aaaaccaaaa tttcagtggg   1200
aaatctcaac taaaggcaac tgtaaagcac gctgattggg gaaatctagg gaatggaatt   1260
aatgcacagt tatatgtgaa aacagggtca gattggaaat ggtttgatgg tgagagtgta   1320
gaaattaatt cctccaatgg aactatttta actttagatt tatcatccat ctccgatta   1380 aatgacatta aagagattgg cgtgcagttt atgggctctt cgaaaagcag tggtcaaaca   1440
gctgtatacg ttgacaacgt aacaattcaa taa                                1473
```

<210> SEQ ID NO 2
<211> LENGTH: 490
<212> TYPE: PRT
<213> ORGANISM: Unknown
<220> FEATURE:
<223> OTHER INFORMATION: Parent protein (including signal peptide), encoded by Seq-ID 1. Signal peptide is pos 1 to 30.
<220> FEATURE:
<221> NAME/KEY: misc_feature
<222> LOCATION: (1)..(30)
<223> OTHER INFORMATION: Signal Peptide

<400> SEQUENCE: 2

```
Met Ser Ile Ile Lys Lys Val Pro Leu Ile Phe Leu Cys Leu Leu Met
1               5                   10                  15

Phe Ala Thr Ser Leu Phe Ile Phe Lys Pro Glu Val Lys Ala Ala Thr
            20                  25                  30

Gly Phe Tyr Val Asn Gly Asn Thr Leu Tyr Asp Ala Thr Gly Ser Pro
        35                  40                  45

Phe Val Met Arg Gly Ile Asn His Ala His Ser Trp Phe Lys Asp Asp
    50                  55                  60

Ser Ser Thr Ala Ile Pro Ala Ile Ala Lys Thr Gly Ala Asn Thr Ile
65                  70                  75                  80

Arg Ile Val Leu Ser Asp Gly Ser Gln Tyr Thr Lys Asp Asp Ile Asn
                85                  90                  95

Thr Val Lys Ser Leu Ile Ser Leu Ala Glu Lys Asn Asn Leu Ile Ala
            100                 105                 110

Ile Leu Glu Val His Asp Ala Thr Gly Asn Asp Ala Val Ser Ser Leu
        115                 120                 125

Asn Asp Ala Val Ser Tyr Trp Ile Ser Ile Lys Glu Ala Leu Ile Gly
    130                 135                 140

Lys Glu Asp Arg Val Leu Ile Asn Ile Ala Asn Glu Trp Tyr Gly Thr
145                 150                 155                 160

Trp Asp Gly Ala Ser Trp Ala Ser Gly Tyr Lys Gln Ala Ile Pro Lys
```

```
                    165                 170                 175

Leu Arg Asp Ala Gly Leu Ser His Thr Leu Ile Val Asp Ser Ala Gly
            180                 185                 190

Trp Gly Gln Tyr Pro Glu Ser Ile His Gln Tyr Gly Lys Asp Val Phe
        195                 200                 205

Asn Ala Asp Pro Leu Lys Asn Thr Met Phe Ser Ile His Met Tyr Glu
    210                 215                 220

Tyr Ala Gly Gly Asp Ala Ser Thr Ile Lys Ser Asn Ile Asp Gly Val
225                 230                 235                 240

Leu Asn Gln Asp Leu Ala Leu Ile Ile Gly Glu Phe Gly His Lys His
                245                 250                 255

Thr Asn Gly Asp Val Asp Glu Glu Thr Ile Met Ser Tyr Ser Gln Gln
            260                 265                 270

Lys Asn Val Gly Trp Leu Ala Trp Ser Trp Lys Gly Asn Gly Pro Glu
        275                 280                 285

Trp Ser Tyr Leu Asp Leu Ser Asn Asp Trp Ala Gly Asp Asn Leu Thr
    290                 295                 300

Ser Trp Gly Asn Thr Ile Val Asn Gly Ala Asn Gly Leu Lys Ala Thr
305                 310                 315                 320

Ser Lys Ile Ser Pro Val Phe Asp Gly Gly Asp His Pro Gly Gly Ser
                325                 330                 335

Gly Gly Thr Glu Asn Thr Leu Tyr Asn Phe Glu Thr Glu Thr Gln Ser
            340                 345                 350

Trp Ser Gly Gly Asn Val Met Ala Gly Pro Trp Ser Thr Asn Glu Trp
        355                 360                 365

Ala Ser Lys Asp Asn Tyr Ser Leu Lys Ala Asp Val Gln Leu Asn Asn
    370                 375                 380

Asn Ser Gln His Tyr Leu Ser Leu Thr Gln Asn Gln Asn Phe Ser Gly
385                 390                 395                 400

Lys Ser Gln Leu Lys Ala Thr Val Lys His Ala Asp Trp Gly Asn Leu
                405                 410                 415

Gly Asn Gly Ile Asn Ala Gln Leu Tyr Val Lys Thr Gly Ser Asp Trp
            420                 425                 430

Lys Trp Phe Asp Gly Glu Ser Val Glu Ile Asn Ser Ser Asn Gly Thr
        435                 440                 445

Ile Leu Thr Leu Asp Leu Ser Ser Ile Ser Asp Leu Asn Asp Ile Lys
    450                 455                 460

Glu Ile Gly Val Gln Phe Met Gly Ser Ser Lys Ser Ser Gly Gln Thr
465                 470                 475                 480

Ala Val Tyr Val Asp Asn Val Thr Ile Gln
                485                 490

<210> SEQ ID NO 3
<211> LENGTH: 460
<212> TYPE: PRT
<213> ORGANISM: Unknown
<220> FEATURE:
<223> OTHER INFORMATION: Mature parent protein (without signal peptide),
      encoded by Seq-ID 1 pos 91 to 1470.

<400> SEQUENCE: 3

Ala Thr Gly Phe Tyr Val Asn Gly Asn Thr Leu Tyr Asp Ala Thr Gly
1               5                   10                  15

Ser Pro Phe Val Met Arg Gly Ile Asn His Ala His Ser Trp Phe Lys
            20                  25                  30
```

```
Asp Asp Ser Ser Thr Ala Ile Pro Ala Ile Ala Lys Thr Gly Ala Asn
         35                  40                  45

Thr Ile Arg Ile Val Leu Ser Asp Gly Ser Gln Tyr Thr Lys Asp Asp
 50                  55                  60

Ile Asn Thr Val Lys Ser Leu Ile Ser Leu Ala Glu Lys Asn Asn Leu
 65                  70                  75                  80

Ile Ala Ile Leu Glu Val His Asp Ala Thr Gly Asn Asp Ala Val Ser
                 85                  90                  95

Ser Leu Asn Asp Ala Val Ser Tyr Trp Ile Ser Ile Lys Glu Ala Leu
             100                 105                 110

Ile Gly Lys Glu Asp Arg Val Leu Ile Asn Ile Ala Asn Glu Trp Tyr
         115                 120                 125

Gly Thr Trp Asp Gly Ala Ser Trp Ala Ser Gly Tyr Lys Gln Ala Ile
     130                 135                 140

Pro Lys Leu Arg Asp Ala Gly Leu Ser His Thr Leu Ile Val Asp Ser
145                 150                 155                 160

Ala Gly Trp Gly Gln Tyr Pro Glu Ser Ile His Gln Tyr Gly Lys Asp
                 165                 170                 175

Val Phe Asn Ala Asp Pro Leu Lys Asn Thr Met Phe Ser Ile His Met
             180                 185                 190

Tyr Glu Tyr Ala Gly Gly Asp Ala Ser Thr Ile Lys Ser Asn Ile Asp
         195                 200                 205

Gly Val Leu Asn Gln Asp Leu Ala Leu Ile Ile Gly Glu Phe Gly His
     210                 215                 220

Lys His Thr Asn Gly Asp Val Asp Glu Glu Thr Ile Met Ser Tyr Ser
225                 230                 235                 240

Gln Gln Lys Asn Val Gly Trp Leu Ala Trp Ser Trp Lys Gly Asn Gly
                 245                 250                 255

Pro Glu Trp Ser Tyr Leu Asp Leu Ser Asn Asp Trp Ala Gly Asp Asn
             260                 265                 270

Leu Thr Ser Trp Gly Asn Thr Ile Val Asn Gly Ala Asn Gly Leu Lys
         275                 280                 285

Ala Thr Ser Lys Ile Ser Pro Val Phe Asp Gly Gly Asp His Pro Gly
     290                 295                 300

Gly Ser Gly Gly Thr Glu Asn Thr Leu Tyr Asn Phe Glu Thr Glu Thr
305                 310                 315                 320

Gln Ser Trp Ser Gly Gly Asn Val Met Ala Gly Pro Trp Ser Thr Asn
                 325                 330                 335

Glu Trp Ala Ser Lys Asp Asn Tyr Ser Leu Lys Ala Asp Val Gln Leu
             340                 345                 350

Asn Asn Asn Ser Gln His Tyr Leu Ser Leu Thr Gln Asn Gln Asn Phe
         355                 360                 365

Ser Gly Lys Ser Gln Leu Lys Ala Thr Val Lys His Ala Asp Trp Gly
     370                 375                 380

Asn Leu Gly Asn Gly Ile Asn Ala Gln Leu Tyr Val Lys Thr Gly Ser
385                 390                 395                 400

Asp Trp Lys Trp Phe Asp Gly Glu Ser Val Glu Ile Asn Ser Ser Asn
                 405                 410                 415

Gly Thr Ile Leu Thr Leu Asp Leu Ser Ser Ile Ser Asp Leu Asn Asp
             420                 425                 430

Ile Lys Glu Ile Gly Val Gln Phe Met Gly Ser Ser Lys Ser Ser Gly
         435                 440                 445

Gln Thr Ala Val Tyr Val Asp Asn Val Thr Ile Gln
```

```
                         450             455             460

<210> SEQ ID NO 4
<211> LENGTH: 297
<212> TYPE: PRT
<213> ORGANISM: Unknown
<220> FEATURE:
<223> OTHER INFORMATION: Catalytic domain of parent protein,
      encoded by Seq-ID 1 pos 91 to 981.

<400> SEQUENCE: 4

Ala Thr Gly Phe Tyr Val Asn Gly Asn Thr Leu Tyr Asp Ala Thr Gly
1               5                   10                  15

Ser Pro Phe Val Met Arg Gly Ile Asn His Ala His Ser Trp Phe Lys
            20                  25                  30

Asp Asp Ser Ser Thr Ala Ile Pro Ala Ile Ala Lys Thr Gly Ala Asn
        35                  40                  45

Thr Ile Arg Ile Val Leu Ser Asp Gly Ser Gln Tyr Thr Lys Asp Asp
    50                  55                  60

Ile Asn Thr Val Lys Ser Leu Ile Ser Leu Ala Glu Lys Asn Asn Leu
65                  70                  75                  80

Ile Ala Ile Leu Glu Val His Asp Ala Thr Gly Asn Asp Ala Val Ser
                85                  90                  95

Ser Leu Asn Asp Ala Val Ser Tyr Trp Ile Ser Ile Lys Glu Ala Leu
            100                 105                 110

Ile Gly Lys Glu Asp Arg Val Leu Ile Asn Ile Ala Asn Glu Trp Tyr
        115                 120                 125

Gly Thr Trp Asp Gly Ala Ser Trp Ala Ser Gly Tyr Lys Gln Ala Ile
    130                 135                 140

Pro Lys Leu Arg Asp Ala Gly Leu Ser His Thr Leu Ile Val Asp Ser
145                 150                 155                 160

Ala Gly Trp Gly Gln Tyr Pro Glu Ser Ile His Gln Tyr Gly Lys Asp
                165                 170                 175

Val Phe Asn Ala Asp Pro Leu Lys Asn Thr Met Phe Ser Ile His Met
            180                 185                 190

Tyr Glu Tyr Ala Gly Gly Asp Ala Ser Thr Ile Lys Ser Asn Ile Asp
        195                 200                 205

Gly Val Leu Asn Gln Asp Leu Ala Leu Ile Ile Gly Glu Phe Gly His
    210                 215                 220

Lys His Thr Asn Gly Asp Val Asp Glu Glu Thr Ile Met Ser Tyr Ser
225                 230                 235                 240

Gln Gln Lys Asn Val Gly Trp Leu Ala Trp Ser Trp Lys Gly Asn Gly
                245                 250                 255

Pro Glu Trp Ser Tyr Leu Asp Leu Ser Asn Asp Trp Ala Gly Asp Asn
            260                 265                 270

Leu Thr Ser Trp Gly Asn Thr Ile Val Asn Gly Ala Asn Gly Leu Lys
        275                 280                 285

Ala Thr Ser Lys Ile Ser Pro Val Phe
    290                 295
```